US008863201B2

(12) United States Patent
Brooks et al.

(10) Patent No.: US 8,863,201 B2
(45) Date of Patent: Oct. 14, 2014

(54) GATEWAY APPARATUS AND METHODS FOR PROVIDING CONTENT AND DATA DELIVERY IN A FIBER-BASED CONTENT DELIVERY NETWORK

(75) Inventors: Paul D. Brooks, Weddington, NC (US); Robert Harris, Venice, FL (US)

(73) Assignee: Time Warner Cable Enterprises LLC, New York, NY (US)

(*) Notice: Subject to any disclaimer, the term of this patent is extended or adjusted under 35 U.S.C. 154(b) by 7 days.

(21) Appl. No.: 13/361,856

(22) Filed: Jan. 30, 2012

(65) Prior Publication Data

US 2013/0198796 A1 Aug. 1, 2013

(51) Int. Cl.
H04N 7/18 (2006.01)

(52) U.S. Cl.
USPC .......................................................... 725/78

(58) Field of Classification Search
USPC .......................................................... 725/78
See application file for complete search history.

(56) References Cited

U.S. PATENT DOCUMENTS

| | | | |
|---|---|---|---|
| 5,557,319 A | 9/1996 | Gurusami et al. | |
| 5,765,097 A | 6/1998 | Dail | |
| 5,864,672 A | 1/1999 | Bodeep et al. | |
| 6,317,884 B1 | 11/2001 | Eames et al. | |
| 6,381,248 B1 | 4/2002 | Lu | |
| 6,396,531 B1 | 5/2002 | Gerszberg et al. | |
| 6,546,016 B1 | 4/2003 | Gerszberg et al. | |
| 6,577,414 B1 | 6/2003 | Feldman et al. | |
| 6,711,742 B1 | 3/2004 | Kishi et al. | |
| 6,765,931 B1 | 7/2004 | Rabenko et al. | |
| 6,889,385 B1 * | 5/2005 | Rakib et al. | 725/119 |
| 6,912,209 B1 | 6/2005 | Thi et al. | |
| 6,931,018 B1 | 8/2005 | Fisher | |
| 6,978,474 B1 | 12/2005 | Sheppard et al. | |
| 6,985,492 B1 | 1/2006 | Thi et al. | |
| 7,023,868 B2 | 4/2006 | Rabenko et al. | |
| 7,184,664 B2 | 2/2007 | Farmer et al. | |
| 7,231,655 B2 | 6/2007 | Brooks | |
| 7,257,106 B2 | 8/2007 | Chen et al. | |
| 7,333,483 B2 | 2/2008 | Zhao et al. | |
| 7,366,415 B2 | 4/2008 | Lee et al. | |
| 7,382,786 B2 | 6/2008 | Chen | |
| 7,529,485 B2 | 5/2009 | Farmer et al. | |
| 7,584,490 B1 * | 9/2009 | Schlack | 725/35 |
| 7,596,801 B2 | 9/2009 | Wall et al. | |
| 7,602,820 B2 | 10/2009 | Helms et al. | |

(Continued)

OTHER PUBLICATIONS

Specification and figures of U.S. Appl. No. 61/256,903, filed Oct. 30, 2009 and entitled "Methods and Apparatus for Packetized Content Delivery Over a Content Delivery Network".

*Primary Examiner* — Olubbenga Idowu
(74) *Attorney, Agent, or Firm* — Gazdzinski & Associates, PC

(57) ABSTRACT

Methods and apparatus for the delivery of content in a network via a user premises gateway device in communication with one or more user devices. The gateway device receives content from an optical network (e.g., EPON), processes the content onto one or more communication channels, and delivers it to the user devices. In one variant, the gateway includes switching functionality to receive all available programs, or only a portion thereof, and providing specific ones on an as-needed basis to the user device(s) via the channels. Video on Demand (VOD) and pay-per-view (PPV) as well as other unicast services may also be provided by the gateway apparatus. A DOCSIS or other data channel, as well as a dedicated guide data channel, may be among the provided channels.

23 Claims, 11 Drawing Sheets

(56) References Cited

U.S. PATENT DOCUMENTS

| | | |
|---|---|---|
| 7,657,919 B2 | 2/2010 | Alsobrook et al. |
| 7,701,954 B2 | 4/2010 | Rabenko et al. |
| 7,954,131 B2 | 5/2011 | Cholas et al. |
| 8,180,222 B2 | 5/2012 | Sucharczuk et al. |
| 8,266,429 B2 | 9/2012 | Helms et al. |
| 8,312,267 B2 | 11/2012 | Helms et al. |
| 8,347,341 B2 | 1/2013 | Markley et al. |
| 8,520,850 B2 | 8/2013 | Helms et al. |
| 2002/0038459 A1* | 3/2002 | Talmola et al. ............. 725/81 |
| 2002/0061012 A1 | 5/2002 | Thi et al. |
| 2003/0005453 A1 | 1/2003 | Rodrigues et al. |
| 2003/0056217 A1 | 3/2003 | Brooks |
| 2003/0120742 A1* | 6/2003 | Ohgami et al. ............. 709/217 |
| 2003/0217365 A1 | 11/2003 | Caputo |
| 2004/0133920 A1* | 7/2004 | Kim et al. ............. 725/129 |
| 2005/0055729 A1 | 3/2005 | Atad et al. |
| 2005/0165899 A1 | 7/2005 | Mazzola |
| 2006/0041915 A1 | 2/2006 | Dimitrova et al. |
| 2006/0047957 A1 | 3/2006 | Helms |
| 2006/0117379 A1 | 6/2006 | Bennett et al. |
| 2006/0130113 A1 | 6/2006 | Carlucci |
| 2006/0136968 A1 | 6/2006 | Han et al. |
| 2006/0156392 A1 | 7/2006 | Baugher |
| 2006/0218604 A1 | 9/2006 | Riedl et al. |
| 2007/0022459 A1 | 1/2007 | Gaebel |
| 2007/0025372 A1 | 2/2007 | Brenes et al. |
| 2007/0121678 A1 | 5/2007 | Brooks et al. |
| 2007/0153820 A1 | 7/2007 | Gould |
| 2007/0154041 A1 | 7/2007 | Beauchamp |
| 2007/0217436 A1 | 9/2007 | Markley |
| 2007/0226365 A1 | 9/2007 | Hildreth et al. |
| 2007/0250900 A1 | 10/2007 | Marcuvitz |
| 2007/0276925 A1 | 11/2007 | La Joie |
| 2007/0294738 A1 | 12/2007 | Kuo et al. |
| 2008/0098212 A1 | 4/2008 | Helms |
| 2008/0098450 A1 | 4/2008 | Wu et al. |
| 2008/0112405 A1 | 5/2008 | Cholas |
| 2008/0120667 A1 | 5/2008 | Zaltsman |
| 2010/0191525 A1 | 7/2010 | Rabenko et al. |
| 2011/0002245 A1 | 1/2011 | Wall et al. |
| 2011/0103374 A1 | 5/2011 | Lajoie et al. |
| 2011/0145871 A1* | 6/2011 | Lee et al. ............. 725/98 |
| 2013/0125194 A1 | 5/2013 | Finkelstein et al. |

\* cited by examiner

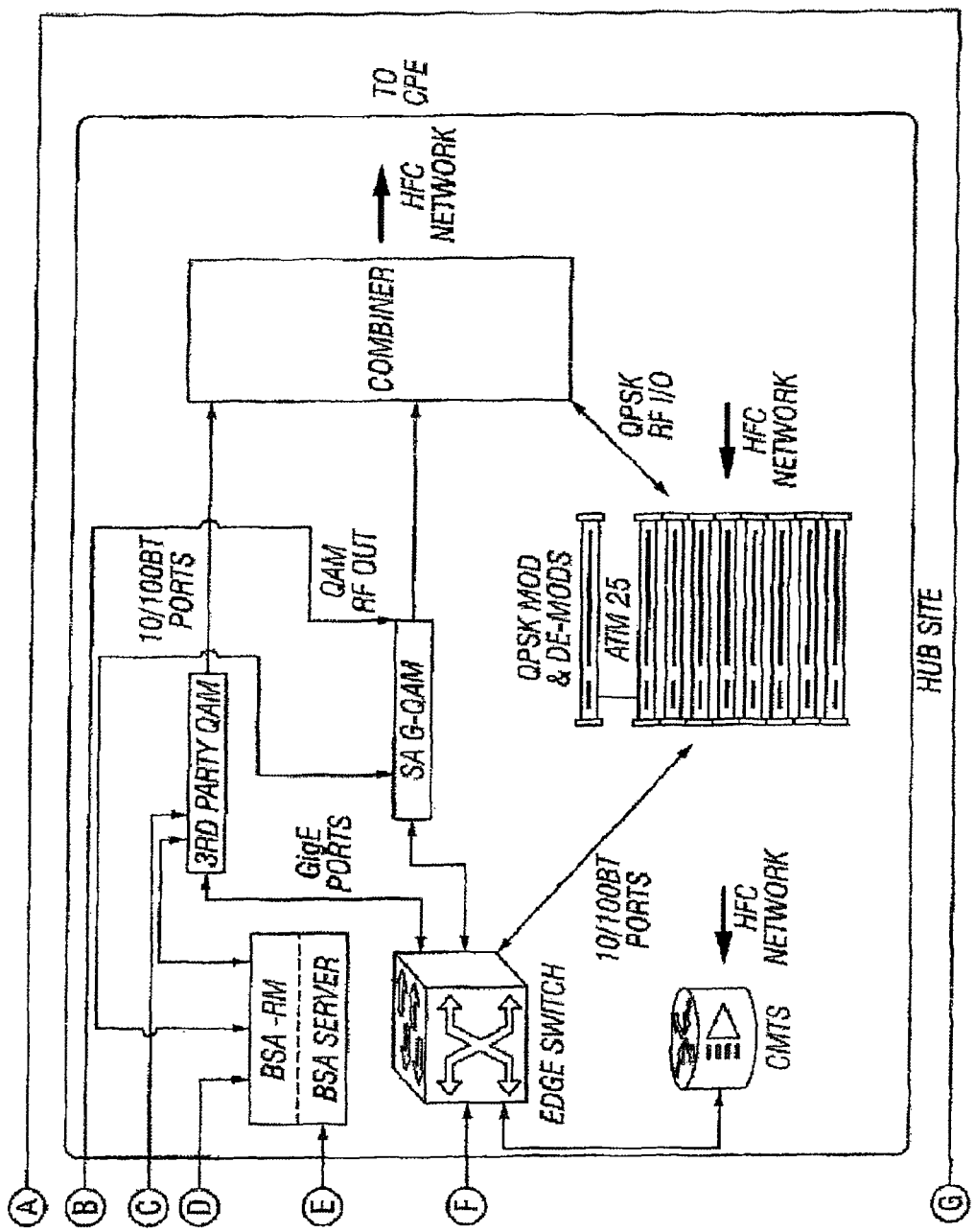
FIG. 2 CONTINUED (PRIOR ART)

GATEWAY APPARATUS AND METHODS FOR PROVIDING CONTENT AND DATA DELIVERY IN A FIBER-BASED CONTENT DELIVERY NETWORK

RELATED APPLICATIONS

This application is related to co-owned and co-pending U.S. Pat. No. 7,954,131 issued on May 31, 2011 and entitled "PREMISES GATEWAY APPARATUS AND METHODS FOR USE IN A CONTENT-BASED NETWORK", this application is also related to co-owned and co-pending U.S. patent application Ser. No. 13/451,396 filed on Apr. 19, 2012 and entitled "APPARATUS AND METHODS FOR DYNAMIC DELIVERY OF OPTICAL AND NON-OPTICAL CONTENT IN A NETWORK" each of which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of data and content distribution networks. More specifically, the present invention relates in one exemplary aspect to methods and apparatus for delivering programming content along with data via an optical fiber (e.g., fiber to the home or FTTH) network to a premises.

2. Description of Related Technology

FIG. 1 illustrates one exemplary implementation of a prior art headend architecture for providing content including e.g., broadcast, on-demand (OD), and pay-per-view (PPV) content. As shown, the headend architecture comprises various headend entities including a billing module, subscriber management system (SMS) and CPE configuration management module, cable-modem termination system (CMTS) and OOB system, as well as LAN(s) placing the various components in data communication with one another.

A key feature of this prior art implementation is the placement of a multiplexer-encrypter-modulator (MEM) at the headend. The MEM processes or conditions content received from the one or more file servers and/or VOD servers and/or real-time streaming video sources for transmission over the network. The MEM processes information so that it may be carried across multiple QAM channels. Thus, the headend must be adapted to acquire the information for the carried channels from various sources. Typically, the channels being delivered from the headend to the CPE ("downstream") are multiplexed together in the headend at the MEM, and sent to neighborhood hubs via a variety of interposed network components. The aforementioned prior art MEM functionality may also be implemented at a network hub.

FIG. 2 illustrates an exemplary prior art "switched" network architecture (also referred to herein as a "broadcast switched architecture" (BSA)) for providing switched digital video or "SDV". As illustrated, the headend contains switched broadcast control and media path functions these elements cooperate to control and feed, respectively, downstream or edge switching devices at the hub site which are used to selectively switch broadcast streams to various service groups.

Generally, packets associated with services are received by an edge switch device, and forwarded to an IP router The IP router examines the packets, and forwards packets intended for the local network to the edge switch. The edge switch forwards the packets received from the IP router to a headend-based or hub-based QAM modulator, which transmits the packets on one or more physical (QAM-modulated RF) channels to the CPE. Packets are transported across an optical IP network, typically using Gigabit or 10 Gigabit Ethernet. In the prior art, a single edge switch (or an off-the-shelf IP switch/router) device is typically utilized to provide SDV or BSA services to a plurality of user premises, each premises having one or more CPE therein.

In contrast to the hybridized networks of FIGS. 1 and 2, fiber-based data delivery networks are becoming increasingly prevalent. One such network, the Fiber-to-the-home or "FTTH", network, delivers communications signals over optical fiber from the MSO switching equipment (at the network headend or distribution hub) all the way to a home, business, or other customer premises. The optical fiber in an FTTH network replaces existing copper infrastructure such as telephone wires and coaxial cable. FTTH provides higher bandwidth to consumers, thus enabling more robust video, internet and voice services than previously available in traditional coaxial cable and/or hybrid fiber coaxial cable (HFC) networks.

Various optical networks may be used to implement FTTH technologies. For example, a passive optical network (PON) such as an Ethernet PON (or EPON) may be utilized. A PON uses point-to-multipoint architecture in which unpowered optical splitters are used to enable a single optical fiber to serve multiple premises. This architecture reduces the amount of fiber and central office equipment required as compared to other, point-to-point architectures. Downstream signals are broadcast to each premises sharing a single fiber. Upstream signals are combined using a multiple access protocol, such as time division multiple access (TDMA). Alternatively, the FTTP technology may be made to work over any native IP access system.

Connecting a premises directly to fiber optic cable enables enormous improvements in the bandwidth that can be provided to consumers. For example, current fiber optic technology can provide two-way transmission speeds of up to 10 Gigabits per second Presently, FTTH technologies are deployed primarily in business or commercial settings. However, the aforementioned bandwidth increase and other advantages associated with fiber delivery are desirable in residential as well as other settings.

A major stumbling block in the progression towards implementing a fully FTTH optical network architecture in managed network scenarios (e.g., for a terrestrial cable television provider) is that legacy systems are currently in use by a majority of the network's subscribers. Conventional set top boxes (STBs) receive and transmit information related to video services via coaxial cable. The coaxial cable, in turn, is then in communication with fiber optic cables in a hybrid fiber-coax (HFC) system. This architecture is utilized to provide a two-way communication path between the set top box and the data service hub. Such two-way communication is necessary for e.g., authorizing a subscriber to view certain programs and channels. For example, on-demand (OD) and pay-per-view (PPV) systems utilize two-way communications between the STB and headend OD/PPV entities. Likewise, in a switched digital video (SDV) system (also referred to as a "broadcast switched architecture" or BSA), requests for content are transmitted upstream to an SDV server from the STB. Traditionally, FTTH systems do not provide a return path for communications upstream from the STB to the network. Generally, the return paths in an FTTH system comprise only fiber optic cables that propagate digital data signals, as opposed to analog RF signals which are required for communication in from the STB back to the network.

Additionally, conventional FTTH systems may suffer the following deficiencies with respect to operation of legacy devices: (i) FTTH may not support the encryption formats which are generally used in legacy devices, (ii) FTTH may not support the "always-on" full carriage of the entire program lineup (and doing so would exceed the capacity of the FTTH system), and (iii) FTTH does not currently have an existing program guide.

Based on the foregoing, what is needed are apparatus and methods for providing FTTH (or other optically based) services in a manner which allows for the use of both legacy user devices as well as non-legacy devices, while also addressing the need for upstream communication from the user devices to the network (such as to provide OD, PPV and SDV functionalities). Such methods and apparatus would also ideally be transparent to the network and the legacy and non-legacy STB.

SUMMARY OF THE INVENTION

The present invention addresses the foregoing needs by providing methods and apparatus for delivering programming content along with data via an optical fiber (e.g., fiber to the home or FTTH) network to a premises.

In a first aspect of the invention, a premises gateway apparatus is disclosed. In one embodiment, the apparatus is configured to deliver content to at least one consumer premises equipment (CPE) in the premises, and comprises at least one first interface for communication to at least one entity of a content delivery network, a storage device, at least one second interface for communication to the at least one CPE, and a processor, the processor configured to run at least one computer program thereon. In one variant, the computer program is configured to: (i) receive at least one signal indicating particular content to be provided to the at least one CPE, (ii) receive the particular content from the content delivery network via an optical fiber, (iii) process the particular content, and (iv) modulate the particular content onto one or more quadrature amplitude modulated (QAM) radio frequency (RF) channels for delivery to the at least one CPE.

In a second aspect of the invention, a method for providing content to at least one client device in a content delivery network via a premises gateway device is disclosed. In one embodiment, the method comprises: (i) receiving a signal indicating a request for a first one of the available content to be delivered to the at least one client device, (ii) determining whether at least one of a plurality of communication channels provided by the gateway device is currently assigned to provide the first one of the available content to the at least one client device, (iii) if at least one of the plurality of communication channels is not currently assigned based on the act of determining, assigning at least one of the plurality of channels to provide the first one of the available content to enable delivery thereof to at least the at least one client device, and (iv) enabling the at least one client device to receive the first one of the content.

In a third aspect of the invention, a gateway apparatus for use within a user premises is disclosed. In one embodiment, the apparatus is configured to deliver content to a plurality of user devices connected thereto, and comprises an optical interface configured to receive a plurality of content from an optical network, a non-optical interface configured to provide individual ones of the received plurality of content to the plurality of user devices via one or more communication channels, and a processor, the processor configured to run at least one computer program thereon. In one variant, the computer program is configured to, when executed: (i) process the received plurality of content, and (ii) modulate at least the requested first one of the plurality of content onto the one or more communication channels for delivery to the at least one of the plurality of user devices via the non-optical interface.

In a fourth aspect of the invention, a method of providing content to a plurality of client devices in a content delivery network is disclosed. In one embodiment, the content is provided via a gateway apparatus, the gateway apparatus being configured to modulate content onto one or more of a plurality of available quadrature amplitude modulated (QAM) radio frequency (RF) channels. In one variant, the method comprises: (i) receiving a plurality of content at the gateway apparatus located at a user premises, (ii) assigning a first one of the plurality of available QAM channels to provide to the plurality of client devices a list of the plurality of content, the plurality of client devices also located at the user premises, (iii) receiving a signal from a network entity, the signal indicating receipt at the network entity of a request for first content from a first one of the plurality of client devices, (iv) in response to receiving the signal, determining whether the first content is allocated to at least one of the plurality of available QAM channels, (v) if the first content is allocated to at least one of the plurality of available QAM channels, notifying the network entity of the at least one QAM on which the first content is allocated, and (vi) if the first content is not allocated to at least one of the plurality of available QAM channels, allocating the first content thereto and notifying the network entity of the allocated one of the plurality of available QAM. The network entity notifies the first one of the plurality of client devices of the at least one QAM on which the first content is allocated based at least in part on the notifications received from the gateway apparatus.

In a fifth aspect of the invention, a method of delivering content to a user at a premises is disclosed. In one embodiment, the method comprises delivering content over a fiber-based distribution network to the premises, causing a gateway at the premises to generate QAM radio frequency (RF) channels for distribution of the content within the premises, and causing the gateway to allocate the content to at least one of the channels.

In a sixth aspect of the invention, a computer readable medium is disclosed. In one embodiment, the computer readable medium comprises a plurality of instructions which are configured to, when executed: (i) receive a plurality of content at a gateway apparatus located at a user premises, (ii) assign a first one of the plurality of available QAM channels to provide to a plurality of client devices a list of a plurality of content, the plurality of client devices also located at the user premises, (iii) receive a signal from a network entity, the signal indicating receipt at the network entity of a request for first content from a first one of the plurality of client devices, and (iv) in response to receipt of the signal, determine whether the first content is allocated to at least one of the plurality of available QAM channels. If the first content is allocated to at least one of the plurality of available QAM channels, the computer program notifies the network entity of the at least one QAM on which the first content is allocated. If the first content is not allocated to at least one of the plurality of available QAM channels, the computer program allocates the first content thereto and notifies the network entity of the allocated one of the plurality of available QAM.

In a seventh aspect of the invention, a system for delivering content to a user at a premises is disclosed.

In an eighth aspect of the invention, a method of doing business is disclosed.

In a ninth aspect of the invention, a method of providing content to a plurality of client devices in a content delivery network via a gateway apparatus, the gateway apparatus being configured to modulate content onto one or more of a plurality of available quadrature amplitude modulated (QAM) radio frequency (RF) channels is disclosed. In one embodiment, the method comprises receiving a plurality of content at the gateway apparatus located at a user premises; assigning a first one of the plurality of available QAM channels to provide to the plurality of client devices a list of the plurality of content, the plurality of client devices also located at the user premises; receiving a signal from a network entity, the signal indicating receipt at the network entity of a request for first content from a first one of the plurality of client devices; in response to receiving the signal, determining whether the first content is allocated to at least one of the plurality of available QAM channels; when the first content is allocated to at least one of the plurality of available QAM channels, notifying the network entity of the at least one QAM on which the first content is allocated; and when the first content is not allocated to at least one of the plurality of available QAM channels, allocating the first content thereto and notifying the network entity of the allocated one of the plurality of available QAM; wherein the network entity notifies the first one of the plurality of client devices of the at least one QAM on which the first content is allocated based at least in part on the notifications received from the gateway apparatus.

In a tenth aspect of the invention, a premises gateway apparatus configured to deliver content to at least one consumer premises equipment (CPE) in the premises is disclosed. In one embodiment, the apparatus comprises at least one first interface for communication to at least one entity of a content delivery network; a storage device; at least one second interface for communication to the at least one CPE; and a processor, the processor configured to run at least one computer program thereon. In one variant, the at least one computer program comprises a plurality of instructions which are configured to, when executed, cause the gateway apparatus to receive at least one signal configured to indicate particular content to be provided to the at least one CPE; determine whether the particular content is among a plurality of content currently delivered to the at least one CPE; when the particular content is determined to be among the plurality of content, provide tuning information to the CPE configured to indicate a quadrature amplitude modulated (QAM) channel on which the particular content may be received; and when the particular content is determined not to be among the plurality of content currently delivered to the at least one CPE, instantiate a new stream for the delivery thereof on one or more available QAM channels.

In an eleventh aspect of the invention, a method for providing content in a content delivery network to a plurality of client devices located within a subscribers premises via a premises gateway device is disclosed. In one embodiment, the method comprises receiving at least a signal indicating a request for items of available content being broadcast by the content delivery network to be delivered to at least one client device; determining whether at least one of a plurality of quadrature amplitude modulated (QAM) radio frequency (RF) communication channels generated by a modulator apparatus of the gateway device is currently assigned to provide the items of available content to the at least one client device; when the at least one of the plurality of QAM RF communication channels is currently assigned based on the act of determining, providing tuning information to the at least one client device, indicating a QAM channel on which the items of available content may be received; when at least one of the plurality of QAM communication channels is not currently assigned based on the act of determining, the gateway device assigning at least one of the plurality of QAM communication channels to provide the items of available content to enable delivery thereof to the at least one client device; and distributing the items of available content via the at least one QAM communication channels generated by the gateway device to the at least one client device.

In a twelfth aspect of the invention, a gateway apparatus for use within a user premises and configured to deliver content to a plurality of user devices connected thereto over one or more quadrature amplitude modulated (QAM) radio frequency (RF) channels is disclosed. In one embodiment, the apparatus comprises an optical interface configured to receive a plurality of content from an optical network; a non-optical interface configured to provide individual ones of the received plurality of content to the plurality of user devices via one or more communication channels; and a processor, the processor configured to run at least one computer program thereon. In one variant, the at least one computer program comprises a plurality of instructions which are configured to, when executed, cause the gateway apparatus to receive at least one request configured to indicate particular content to be provided to the at least one client device; determine whether the particular content is among a plurality of content currently delivered to the at least one client device; when the particular content is determined to be among the plurality of content, provide tuning information to the at least one client device configured to indicate the RF channel on which the particular content may be received directly or indirectly to the at least one client device; and when the particular content is determined not to be among the plurality of content currently delivered to the at least one client device, instantiate a new stream for the delivery thereof on one or more available RF channels.

In a thirteenth aspect of the invention, a method of delivering content to a user at a premises is disclosed. In one embodiment, the method comprises determining whether a particular content is among a plurality of content currently delivered to the premises; when the particular content is determined to be among the plurality of content, providing tuning information to the premise configured to indicate a quadrature amplitude modulated (QAM) radio frequency (RF) channel on which the particular content may be received; when the particular content is determined not to be among the plurality of content currently delivered to the premises, delivering content over a fiber-based distribution network to the premises; causing a gateway at the premises to generate QAM RF channels for distribution of the particular content within the premises; and causing the gateway to allocate the particular content to at least one of the QAM RF channels.

Other features and advantages of the present invention will immediately be recognized by persons of ordinary skill in the art with reference to the attached drawings and detailed description of exemplary embodiments as given below.

Figure 1:
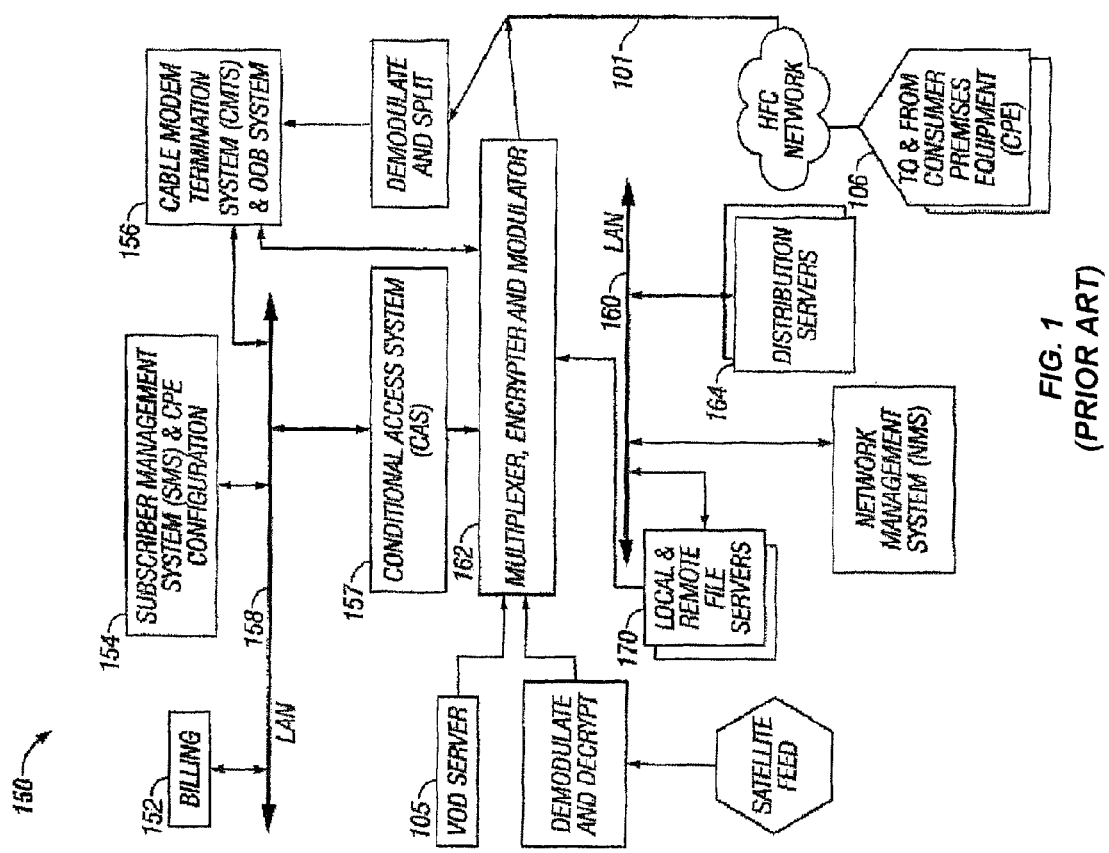
FIG. 1 is a functional block diagram illustrating a prior art HFC cable network headend configuration.

All Figures © Copyright 2011 Time Warner Cable, Inc. All rights reserved.

DETAILED DESCRIPTION OF THE INVENTION

Reference is now made to the drawings, wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), gateways, personal computers (PCs), and minicomputers, whether desktop, laptop, or otherwise, and mobile devices such as handheld computers, PDAs, personal media devices (PMDs), and smartphones.

As used herein, the term "codec" refers to an video, audio, or other data coding and/or decoding algorithm, process or apparatus including, without limitation, those of the MPEG (e.g., MPEG-1, MPEG-2, MPEG-4, MPEG-4 Part 2, MPEG-4 Part 10, etc.), Real (RealVideo, etc.), AC-3 (audio), DiVX, XViD/ViDX, Windows Media Video (e.g., WMV 7, 8, or 9), ATI Video codec, H.263, H.264, Sorenson Spark, FFmpeg, 3ivx, x264, VP6, VP6-E, VP6-S, VP7, Sorenson 3, Theora, Cinepack, Huffyuv, Lagarith, SheerVideo, Mobiclip or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

The terms "Consumer Premises Equipment (CPE)" and "host device" refer to any type of electronic equipment located within a consumer's or user's premises and connected to a network. The term "host device" refers generally to a terminal device that has access to digital television content via a satellite, cable, or terrestrial network. The host device functionality may be integrated into a digital television (DTV) set. The term "consumer premises equipment" (CPE) includes such electronic equipment such as set-top boxes, televisions, Digital Video Recorders (DVR), gateway storage devices (Furnace), and ITV Personal Computers, as well as client devices.

As used herein, the term "display" means any type of device adapted to display information, including without limitation: CRTs, LCDs, TFTs, plasma displays, LEDs, incandescent and fluorescent devices. Display devices may also include less dynamic rendering devices such as, for example, printers, e-ink devices, and the like.

As used herein, the "DOCSIS" refers to any of the existing or planned variants of the Data Over Cable Services Interface Specification, including for example DOCSIS versions 1.0, 1.1, 2.0 and 3.0. As used herein, the term "DVR" (digital video recorder) refers generally to any type of recording mechanism and/or software environment, located in the headend, the user premises or anywhere else, whereby content sent over a network can be recorded and selectively recalled. Such DVR may be dedicated in nature, or part of a non-dedicated or multi-function system.

As used herein, the term "headend" refers generally to a networked system controlled by an operator (e.g., an MSO or multiple systems operator) that distributes programming to MSO clientele using client devices. Such programming may include literally any information source/receiver including, inter alia, free-to-air TV channels, pay TV channels, interactive TV, and the Internet. Multiple regional headends may be in the same or different cities.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, fiber to the home (FTTH), fiber to the curb (FTTC), satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, fiber networks (e.g., FTTH, Fiber-to-the-curb or FTTC, etc.), satellite networks, telco networks, and data networks (including MANs, WANs, LANs, WLANs, internets, and intranets).

As used herein, the terms "network agent" and "network entity" refers to any network entity (whether software, firmware, and/or hardware based) adapted to perform one or more specific purposes. For example, a network agent or entity may comprise a computer program running in server belonging to a network operator, which is in communication with one or more processes on a CPE or other device.

As used herein, the term "network interface" refers to any signal, data, or software interface with a component, network or process including, without limitation, those of the Firewire (e.g., FW400, FW800, etc.), USB (e.g., USB 2.0 or 3.0), Ethernet (e.g., 10/100, 10/100/1000 (Gigabit Ethernet), 10-Gig-E, etc.), Thunderbolt, MoCA, Serial ATA (e.g., SATA, e-SATA, SATAII), Ultra-ATA/DMA, Coaxsys (e.g., TVnet™), radio frequency tuner (e.g., in-band or out-of band, cable modem, etc.), Wi-Fi (e.g., 802.11a, b, g, n, v), WiMAX (802.16), PAN (802.15), or IrDA families.

As used herein, the term "node" refers without limitation to any location, functional entity, or component within a network.

As used herein, the term "on-demand" or "OD" is meant to include without limitation any service that enables real, quasi-real time (e.g. "trick" mode delivery) or even non-real time delivery of content such as audio and/or video programs at any resolution, or data. Such content may be, for example, stored or temporarily cached on a server, or streamed directly from a source, and may be in response to a user-initiated event, service profile or configuration, headend event, or otherwise.

As used herein, the term "QAM" refers to modulation schemes used for sending signals over cable networks. Such modulation scheme might use any constellation level (e.g. QPSK, QAM-16, QAM-64, QAM-256 etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "service", "content", "program" and "stream" are sometimes used synonymously to refer to a sequence of packetized data that is provided in what a subscriber may perceive as a service. A "service" (or "content", or "stream") in the former, specialized sense may correspond to different types of services in the latter, non-technical sense. For example, a "service" in the specialized sense may correspond to, among others, video broadcast, audio-only broadcast, pay-per-view, or video-on-demand. The perceivable content provided on such a "service" may be live, pre-recorded, delimited in time, undelimited in time, or of other descriptions. In some cases, a "service" in the specialized sense may correspond to what a subscriber would perceive as a "channel" in traditional broadcast television.

As used herein, the term "service group" refers to either a group of service users (e.g. subscribers) or the resources shared by them in the form of entire cable RF signal, only the RF channels used to receive the service or otherwise treated as a single logical unit by the network for resource assignment.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "user interface" refers to, without limitation, any visual, graphical, tactile, audible, sensory, or other means of providing information to and/or receiving information from a user or other entity.

Overview

In one salient aspect, the present invention discloses methods and apparatus for providing content to a plurality of devices via a premises gateway. A gateway device is disposed at a user premises and is in communication with a plurality of user devices. The gateway apparatus is configured to receive signals carried over a fiber to the home (FTTH) or fiber to the premises (FTTP)/Ethernet passive optical network (EPON) or other optical network. The gateway processes the received signals (e.g., video content) and places them onto one or more quadrature amplitude modulated (QAM) channels deliverable to the user devices.

In one embodiment, a single gateway device acts effectively as a "service group" with which a headend or hub switching entity is in communication. Alternatively (or in addition), the gateway may include switching functionality. In the instance the gateway includes switching functionality, the gateway may be configured to receive all available programs (or only a portion thereof), and provide specific ones of these programs on an as-needed basis to one or more other user premises devices.

Additionally, the gateway apparatus may be configured to multiplex and encrypt content prior to sending the content to the user devices.

According to one embodiment of the present invention, very few QAM channels are needed in the premises for delivery of the aforementioned content to the user device(s); hence, unused capacity may advantageously be "padded" with other types/sources of content including e.g., locally generated content, predictively inserted content, etc. A single QAM channel (e.g., DOCSIS), as well as a dedicated guide data QAM, may be among the QAM channels utilized by the gateway for providing services to the user premises device(s).

Video on Demand (VOD) and pay-per-view (PPV), as well as other unicast services may also be provided using QAM modulated channels provided by the gateway apparatus.

DETAILED DESCRIPTION OF EXEMPLARY EMBODIMENTS

Exemplary embodiments of the apparatus and methods of the present invention are now described in detail. While these exemplary embodiments are described in the context of a fiber-to-the-home (FTTH), fiber-to-the-curb (FTTC), fiber-to-the-building (FTTB), or fiber-to-the-premises (FTTP) architectures having an multiple systems operator (MSO), digital networking capability, and plurality of client devices/CPE, the general principles and advantages of the invention may be extended to other types of networks and architectures, whether broadband, narrowband, wired or wireless, content or data, or otherwise. Hence, the following description is merely exemplary in nature.

It will also be appreciated that while described generally in the context of a network providing service to a customer or consumer (i.e., residential) end user domain, the present invention may be readily adapted to other types of environments including, e.g., commercial/enterprise, and government/military applications. Myriad other applications are possible.

Also, while certain aspects are described primarily in the context of the well-known IP or Internet Protocol (described in, inter alia, RFC 791 and 2460), it will be appreciated that the present invention may utilize other types of transports or protocols (and in fact bearer networks to include other internets and intranets) to implement the described functionality.

It will further be appreciated that while the exemplary embodiments presented herein are described in the context of services that may include multicast and unicast data, the present invention is applicable to other types of services that include multicast transmission of data delivered over a network having multiple physical channels or even virtual or logical channels.

Fiber Delivery Networks—

Figure 2:
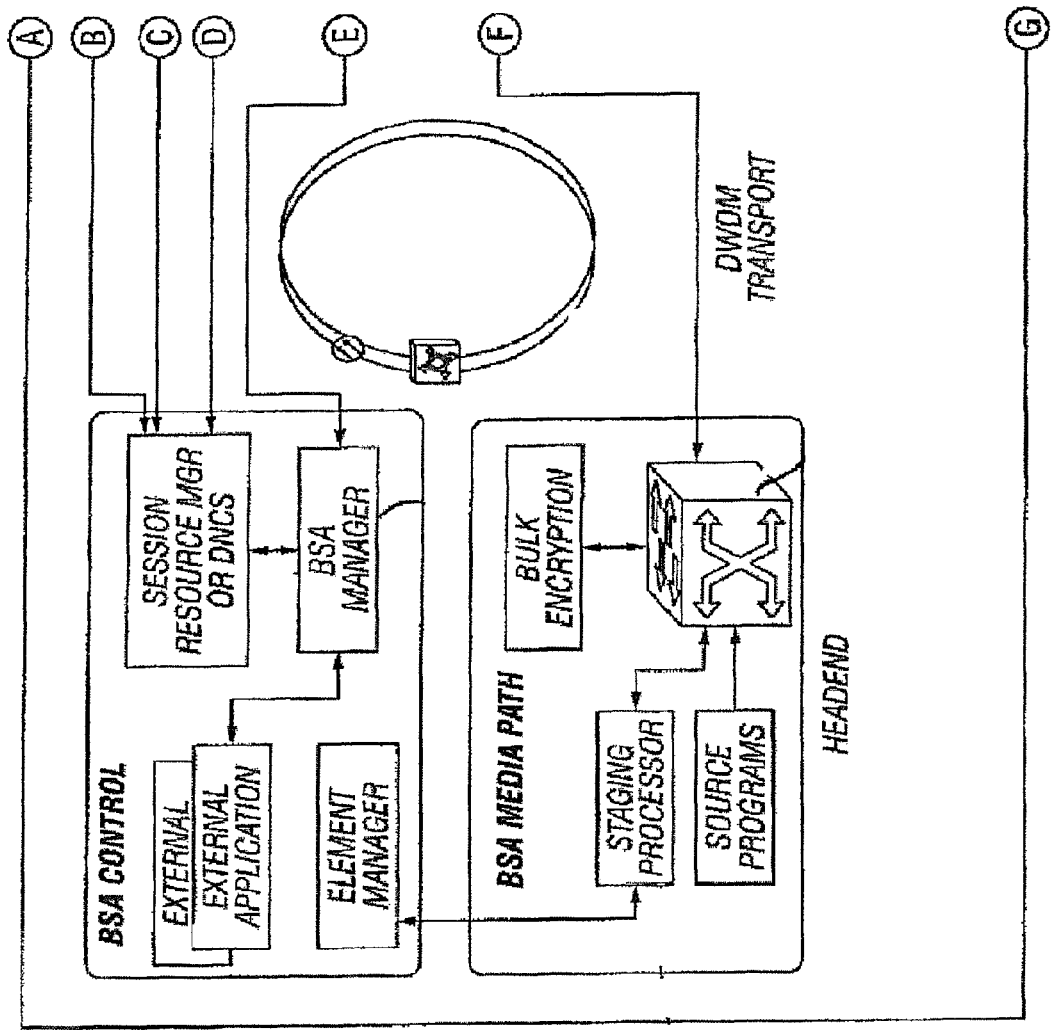
FIG. 2 is a functional block diagram illustrating a prior art broadcast switched architecture (BSA) or switched digital video (SDV) network.
Figure 3:
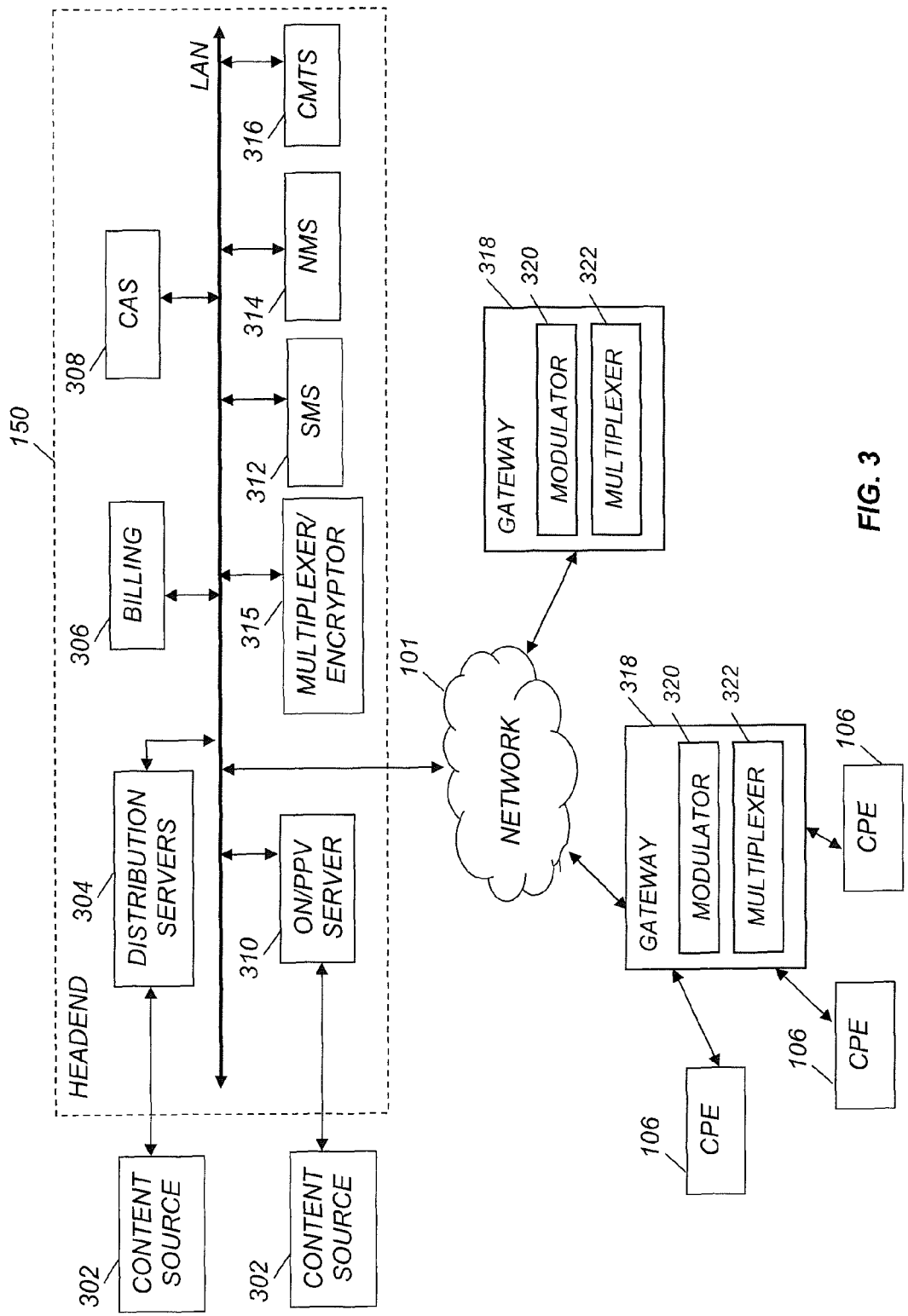
FIG. 3 is a functional block diagram illustrating an exemplary communications network for providing content and data delivery in a fiber-to-the-home (FTTH) network useful with the present invention.
Figure 4:
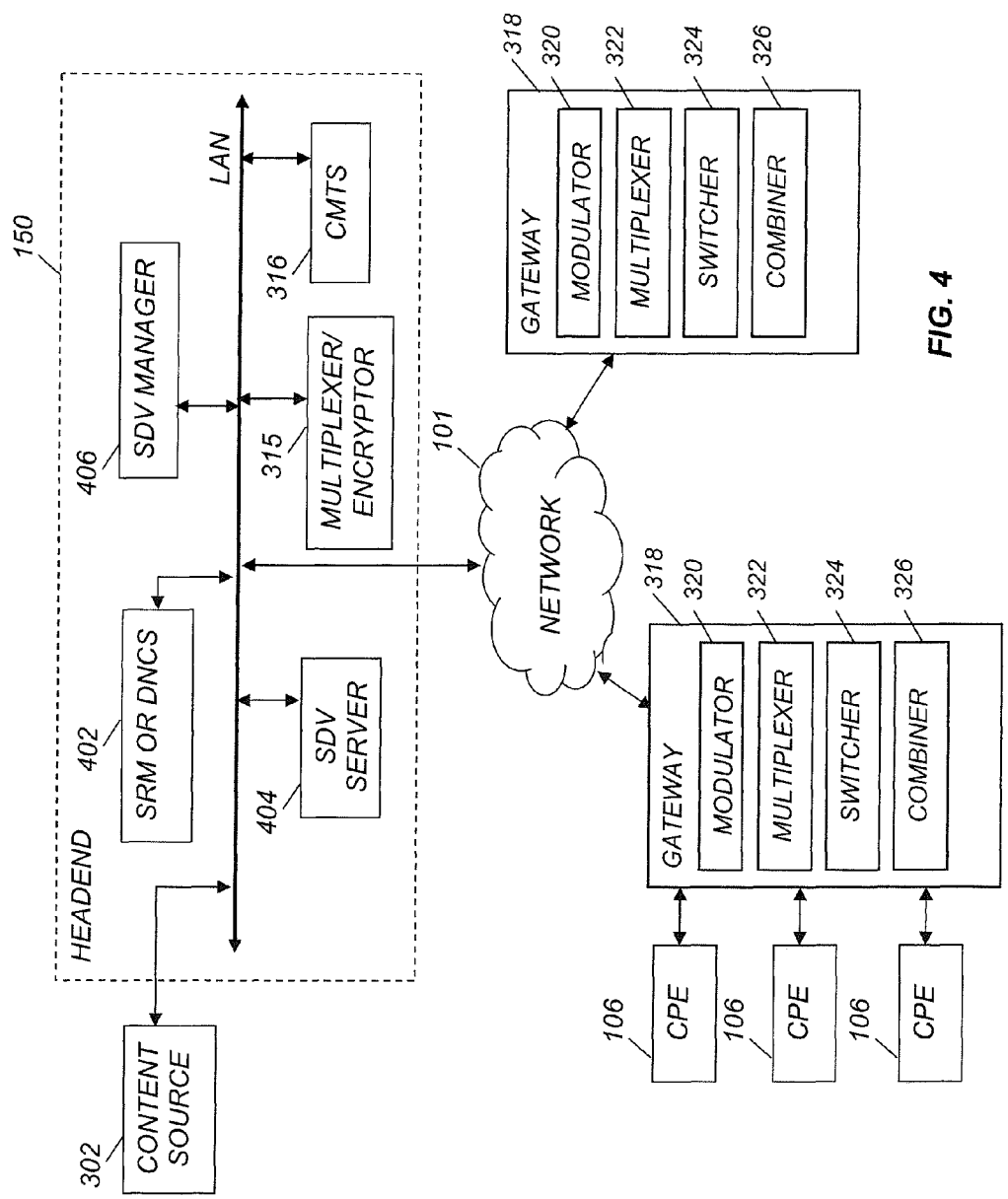
FIG. 4 is a functional block diagram illustrating an exemplary BSA/SDV network for providing content and data delivery in an FTTH network useful with the present invention.

Referring now to FIGS. 3 and 4, exemplary architectures for providing and receiving content according to the present invention are described. As illustrated and described below, one feature of the described embodiments of the invention is the generation of QAM channels at the subscriber's premises (as opposed to these being generated at the network or distribution hub, as in FIGS. 1 and 2 discussed above). User premises QAM generation advantageously moves resource contention from the RF QAM array (at the network or hub) into the IP connection (e.g., EPON system) which is generally better equipped to eliminate or reduce QAM contention.

It is also noted that in one embodiment, there is no RF path for CPE communications, and hence, alternative communications means are discussed below.

According to the illustrated embodiments, few QAM channels are needed in the premises being serviced. In one implementation, only one stream per active tuner (viewing, picture-in-picture (PIP), recording, etc.) is needed per premises. Hence, the "service group" according to this implementation is a single premises (e.g., home), as opposed to the multiple premises within a service group under the prior art methods of FIGS. 1 and 2.

In a typical example, three simultaneous HD streams may be required at peak viewing times. This consumes roughly 37.5 Mbit/sec of the EPON capacity. For six HD streams, two QAM channels peak at about 75 Mbit/sec (ingestion), but only when fully utilized. When not utilized, the QAMs may locally pad the unused capacity. As discussed elsewhere herein, unused capacity may also be advantageously utilized for providing additional content including e.g., predictive content.

Hence there is a multicast gain in the EPON network which further reduces the bandwidth demand. For example, oversubscription rates on the order of 300% or more may be achieved.

SDV (also referred to herein as BSA) may also utilize similar multicast-like gains in the HFC network by allowing shared viewing of program streams. However, the necessity to "pack" these streams to fit within individual 6 MHz QAM channels inevitably leaves surplus capacity untapped, because program streams are different "sizes" (bit rates) and do not fill the small capacity of a single channel exactly.

Additionally, the legacy SDV system must employ preconditioned "clamped maximum rate" or "constant bit rate" (CBR) streams in order to guarantee that the sum total of rates will not overflow the capacity of an individual QAM channel. However, a great percentage of the time, a given stream does not require the allocated clamped or CBR rate, and therefore is often provided more bandwidth than would otherwise be needed. The present invention overcomes this limitation by, inter alia, making practical the use of fully variable bit rate (VBR) program streams (as discussed herein). In one embodiment, the bandwidth offered via the native IP connections likely to be used (1 Gbit/s EPON, 10 Gbit/s EPON) is so large that from a statistical viewpoint, momentary bit rate increases in one stream are safely counteracted by momentary bit rate reductions in other streams. Unlike QAM channels in HFC plant, the number of QAM channels needed in an individual premises is not constrained by available spectrum. The present invention requires far fewer channels than that previously required in legacy systems, therefore extra QAM channels may be easily provided to accommodate safe transmission of VBR streams. This VBR leverage offers in exemplary implementations an additional 20% to 40% capacity.

Additionally, a single QAM channel is devoted to the guide data server in the exemplary embodiment (not shown). The feed to this server already exists under the prior art implementations; however, in the illustrated embodiments, it is multicast on the EPON network. In one variant, 37.5 Mbit/sec are required to copy the existing feed. In another variant, further reductions in this rate are possible due to the small number of connected client devices (e.g., CPE 106) per guide data stream (e.g., 32-premises EPON network).

In a 32-home EPON network with 1 Gbit/sec available, a total of 80 different MPEG-2 HD streams can be carried. Actual traffic from 32 homes will contain a mix of HD and SD streams, and due to multicast and simultaneous use oversubscription, perhaps only 20 streams (250 Mbit/sec) would be consumed at peak hours, leaving the remaining capacity for data or other services. MPEG-4 can also be used to double the effective capacity (the system as described is agnostic to payload), in that it requires effectively half the bandwidth of MPEG-2. This additional capacity can be used in various ways; e.g., it can be shared with VoD, such as by using off-the-shelf technology (e.g. Cisco® Universal Session and Resource Manager (USRM) platform). Thus, no additional bandwidth for VoD is necessary, and legacy VoD subsystems can continue to be used along with the architecture of the present invention.

If analog service is offered, it may be provided in various ways, including for example by using an "always on" multi-program transport stream (MPTS) with gateway-based vestigial sideband amplitude modulation (VSB-AM), such as that utilized by existing Broadlogic® apparatus. The delivery of analog content consumes bandwidth that would otherwise be available for carrying IP traffic. For example, a 72 channel analog offering consumes about 6 QAM channels, and about 225 Mbit/sec of the available IP bandwidth "all the time." These amounts directly scale; for example, if only 36 channels are needed, only about 112. Mbit/sec are estimated to be utilized, etc. In one embodiment of the invention, however, no analog content is offered, in favor of providing only digital content.

EPON bandwidth permitting, additional MPTS-input QAM channels in the premises (e.g., a subscriber's home) may additionally be used to provide broadcast "in the clear" carriage for direct consumption by QAM tuner enabled devices (e.g., televisions).

A single DOCSIS QAM channel may be provided for legacy modems and DOCSIS set top gateway (or DSG) devices. If provided, the DOCSIS QAM channel may consume an "always on" 37.5 Mbit/sec. A DOCSIS upstream receiver may also be utilized for example at each premises. In one embodiment, this may be accomplished using the methods and apparatus discussed in co-owned U.S. Pat. No. 7,231,655 to Brooks, patented on Jun. 12, 2007 and entitled "TECHNIQUE FOR REVERSE TRANSPORT OF DATA IN A HYBRID FIBER COAX CABLE SYSTEM", which is incorporated herein by reference in its entirety. As discussed therein, a baseband digital signal representing the user data is optically communicated to the headend of an HFC cable system, thereby improving the capacity of at least the fiber optical portion of the system. At a distribution node, the individual RF signals in the aforementioned combined analog upstream signal are selected, and demodulated to form the corresponding digital baseband signals containing the user data. The resulting digital baseband signals are then multiplexed. An optical signal representative of the multiplexed signal is generated, which then traverses an optical fiber extending to the headend. The optical signal in the headend is converted back to the electrical, multiplexed signal. The latter is demultiplexed, resulting in an output of the digital baseband signals, respectively. In one embodiment, a modulating device, together with a combiner, is used to process the digital baseband signals to re-generate the aforementioned combined analog upstream signal so as to feed the prior art CMTS. In another embodiment, the digital baseband signals are directly fed to a modified CMTS having a digital input interface for receiving the baseband signals.

Additionally, Digital Audio-Visual Council (DAVIC) set tops may be supported by analog to digital (A/D) and digital to analog (D/A) block conversion of DAVIC signals in both directions (i.e., upstream and downstream). Alternately, modulators and demodulators may be utilized.

In yet another embodiment, capabilities available in existing DSG (DOCSIS set top gateway) devices may be utilized. Firmware modifications to these devices may be utilized for allowing MoCA capability, or for utilizing a built-in interface (e.g., RJ-45 Ethernet connector) for the IP signals currently being transmitted using DSG RF. Non-DSG settops may also be capable of IP communications via the RJ-45 Ethernet connector.

Total bandwidth required for the aforementioned services in an exemplary 32-subscriber (32 home) network is readily supported by a 1 Gbit/sec EPON network with substantial bandwidth (e.g., for data services) left over.

Single program transport streams (SPTSs) are provided to QAMs may be made available via the EPON OLT shelf on request. The EPON OLT (Optical Line Terminal) shelf is the termination equipment located in the headend or the distribution hub. The EPON OLT typically connects on its so-called "northbound" side to a co-located aggregation router. Additionally, the internal Layer 3 routing capability of the EPON OLT may also enable it to connect to remote routers via metro optical transport links. The EPON OLT supports multiple EPON networks on the so-called "southbound" or "access" side.

In order for the home- or premises-based QAM to ingest SPTS's, it is necessary for it to provide multiplexing capability. This capability is needed to assemble the SPTS's into an MPTS suitable for modulation. This multiplexing utilizes in the exemplary embodiment Internet Group Management Protocol (IGMP) version 3 (IGMPv3) capabilities as discussed below. The QAM unit requests (and is granted) multicast membership to streams available to the EPON OLT shelf.

The Internet Group Management Protocol (IGMP) version 3, also know as IGMPv3, which is commonly employed for QAM-to-router stream requests, may be utilized for the request mechanism, although other approaches may be used with equal success. Multiple program transport streams (MPTSs) are broadcast from the EPON shelf out to the 32 subscriber premises for provision of guide data, analog services, clear QAM service, and DOCSIS service (as discussed above). Clear QAM services refer to the services which must be "on all the time". Digital TV sets are not capable of running the SDV protocol, thus they cannot request a program stream, but rather are able to view a stream that is on all the time. Such streams are "broadcast" in nature, not switched, and in one embodiment are carried on the EPON network as IP multicast.

As will be discussed in greater detail below with respect to FIG. 5, the exemplary gateway device of the present invention contains QAM tuners (for example, a single QAM tuner integrated circuit (IC) with Ethernet IP input, and 20 channels of QAM output) and multiplexing circuitry or code for conversion of incoming SPTSs to MPTSs. Additionally, the gateway may include VSB-AM modulators for analog channels, and/or clear QAM modulators for QAM broadcast service if analog channels and/or QAM broadcast channels are offered. In one embodiment, the gateway includes an IP connection to the EPON system (such as to the EPON optical network unit (ONU)). Alternatively, the gateway may incorporate the EPON ONU itself, and connect directly to the fiber network.

The exemplary embodiment of the gateway further includes an RF output to the existing premises wiring, and if the one or more of the premises devices are MoCA capable, the existing premises wiring may serve as the device-to-device communication system, in addition to carrying RF video. CAT-5 or CAT-6 wiring may also be used, and connected to a router, PC, or other terminal device for data services.

In yet another embodiment, the gateway may communicate wirelessly for network (e.g., Ethernet) connectivity to the CPE, such as via a PAN, WLAN, or other wireless technology.

Referring now to FIG. 3, an exemplary headend and network architecture for providing content and data delivery to both legacy and non-legacy devices in an FTTH network is illustrated. As shown, the headend architecture 150 comprises typical headend components and services including billing module 306, subscriber management system (SMS) 312, cable-modem termination system (CMTS) 316, a conditional access system (CAS) 308, and network management system (NMS) 314. Additionally, the headend 150 comprises one or more distribution servers 304 and VOD servers 310, which receive content from various content sources 302. The components of the headend are in data communication with one another via a local area network (LAN) connection. It will be appreciated that while a bar or bus LAN topology is illustrated, any number of other arrangements (e.g., ring, star, etc.) may be used consistent with the invention. It will also be appreciated that the headend configuration depicted in FIG. 3 is high-level, conceptual architecture, and that each MSO may have multiple headends deployed using common or custom architectures.

It will also be recognized that multiple servers (broadcast, VoD, or otherwise) can be used and disposed at two or more different locations if desired, such as being part of different server "farms". These multiple servers can be used to feed one "service group" or collection of premises, or alternatively different service groups. In a simple architecture, a single server is used to feed one or more service groups. In another variant, multiple servers located at the same location are used to feed one or more service groups. In yet another variant, multiple servers disposed at different locations are used to feed one or more service groups. In one embodiment, each "service group" comprises a single premises (having a single gateway apparatus). However, it is appreciated that a "service group" may encompass, in another embodiment, more than one premises and/or more than one gateway.

An optical transport ring (not shown) is also commonly utilized to distribute the dense wave-division multiplexed (DWDM) optical signals to each hub within the network in an efficient fashion.

As noted above, content (and data) enter the network and are stored and distributed via the aforementioned headend 150 entities. The acquired content and data are then carried across multiple channels to the CPE 106. Typically, several channels are delivered from the headend 150 to the CPE 106 ("downstream") as a multiplexed stream. In one embodiment, the multiplex is provided to a neighborhood hub via a variety of interposed network components. Multiplexing operations (as well as encryption of content and data) may occur at e.g., a headend 150 multiplexer/encryptor entity 315. Alternatively, at least a portion of the multiplexing may be conducted at a BSA switching node or hub (see discussion of FIG. 4 provided subsequently herein).

As yet another alternative, a multi-location or multi-stage approach can be used, such as that described in U.S. patent application Ser. No. 11/048,334, entitled "APPARATUS AND METHODS FOR MULTI-STAGE MULTIPLEXING IN A NETWORK" incorporated herein by reference in its entirety, which discloses inter cilia improved multiplexing apparatus and methods that allow such systems to dynamically compensate for content (e.g., advertisements, promotions, or other programs) that is inserted at a downstream network node such as a local hub, as well as "feed back" and "feed forward" mechanisms for transferring information between multiplexing stages.

The multiplexed stream (e.g., audio, video, data, files, etc.) is ultimately provided to a gateway apparatus 318 in an in-band (downstream) stream via a fiber connection (e.g., FTTH or FTTP).

In yet another embodiment, the gateway device 318 may have the capability to multiplex the received content itself prior to transmission to the connected devices 106 via a multiplexing process 322 running thereon. As will be discussed below, the CPE 106 then demultiplexes the received signals. This embodiment may be more efficient in the instance where the amount of content and data provided to each gateway is considerably smaller than the entire channel lineup. In this case, content (which may be in encrypted form) is provided to the gateway 318 for processing (including multiplexing).

The exemplary premises gateway apparatus 318 further includes a modulator portion 320. The modulator 320 enables the gateway device 318 to process or condition content received from the network for transmission to the various CPE 106 in communication therewith. Processing and conditioning which occurs at the premises gateway 318 includes e.g., allocating one or more QAM channels for delivery of content and data to a requesting device. In this manner, the fiber network may be extended fully into the user premises (at the gateway). Traditional coaxial cabling (or other communication means) may then be used within the premises to provide the content from the gateway 318 to the connected devices 106.

To communicate with the headend or intermediary node, the CPE 106 may use the out-of-band (OOB) or DOCSIS channels and associated protocols to communicate a message to the gateway device 318. The OCAP 1.0, 2.0, 3.0 (and subsequent) specification provides for exemplary networking protocols both downstream and upstream, although the invention is in no way limited to these approaches. The gateway device 318 then transmits the signal upstream via the bidirectional fiber connection to the network 101, or other means.

The foregoing architecture may be used, for example, to enable a CPE 106 to request on-demand content. The request is transmitted upstream from the CPE 106 to the VOD server 310 via the gateway 318. In response to the request, the gateway 318 is provided with a signal indicating that the requested content should be processed and provided to the CPE 106 on an available QAM channel. The CPE 106 separately receives from the VOD server 310 a message indicating a QAM channel to tune to in order to view the requested content.

Referring now to FIG. 4, an exemplary switched network architecture also useful with the present invention is illustrated. While a so-called "broadcast switched architecture" or BSA (also referred to herein as a "switched digital video" or SDV network) network is described as the content allocation mechanism in one embodiment of the invention, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

In the exemplary embodiment of the broadcast switched network architecture of FIG. 4, Specifically, the headend 150 contains functions for controlling and feeding downstream switching devices 324 at the premises gateway 318 which are used to selectively switch broadcast streams to various ones of connected CPE 106. A BSA or SDV server 404 is also disposed at the headend or a hub site (not shown), and implements functions related to switching and bandwidth conservation (in conjunction with a management entity 406 disposed at the headend). An optical transport ring may be utilized to distribute the dense wave-division multiplexed (DWDM) optical signals in an efficient fashion.

Actual switching of various programs for delivery to a plurality of CPE 106 occurs, in the illustrated embodiment, at the switching device 324 of the gateway apparatus 318. The gateway apparatus 318 further comprises one or more of multiplexing 322, modulation 320 and combining 326 functionalities. The exemplary gateway utilizes modulation to enable multicast efficiencies in the EPON network. Multiplexing at the gateway enables SPTSs or other single-program stream types to be multiplexed into MPTSs. Therefore, in one embodiment, the multiplexing and/or QAM modulation functions are moved out of the distribution hub and into the premises (e.g., home).

Co-owned and co-pending U.S. patent application Ser. No. 09/956,688 filed Sep. 20, 2001 and entitled "TECHNIQUE FOR EFFECTIVELY PROVIDING PROGRAM MATERIAL IN A CABLE TELEVISION SYSTEM", incorporated herein by reference in its entirety, describes exemplary broadcast switched digital techniques useful with the present invention, although it will be recognized by those of ordinary skill that other approaches and architectures may be substituted.

In order for the BSA function to be transparent to the subscriber, channel change latencies are kept to a minimum (e.g., 250 ms or less as compared to average linear digital broadcast services). Like video-on-demand (VoD) systems, BSA programs are streamed to a service group only when being viewed. Unlike VoD, many viewers can view the same stream. Typically, only real-time linear programs are included in BSA broadcasts. Since there is no storage involved, the "VCR" controls (e.g., trick mode functions) common to VoD are not available. In this regard, BSA is much simpler than VoD. Commercials or other programming segments cannot be skipped, and program bitrates can be treated as in more conventional systems.

In one embodiment of the present invention, the premises gateway 318 comprises switching functionality 324. Hence, a service node and subsequent gateway device 318 are flooded with all available programs. This improves transport efficiency, because a simple unidirectional "drop and continue" protocol is performed at each premises. The concept of flooding also simplifies the transport network in that no control system is needed; rather a simple "deliver everything" paradigm is used. This approach also advantageously makes this portion of the signal chain more robust, since more complex control systems generally lend themselves to a higher operational failure rate. The present embodiment conserves bandwidth on the necessary QAM channel circuits in the home gateway; however, when used in an EPON system is wasteful because the flooding consumes bandwidth on the EPON even when there is no one viewing the program. Therefore, in yet another embodiment, only the EPON OLT shelf input is flooded, while the EPON network itself carries only viewed program streams via standard IP multicast. The gateway 318 in this embodiment is configured to additionally perform modulation 320, multiplexing 322, and combining 326.

In another embodiment, the gateway 318 may be one of many gateways 318 in a service group which are serviced by an edge switch device (not shown). The edge switch provides to the gateway devices 318 programs on an "as needed" basis. In other words, the edge switch is flooded with programming, but only provides those programs which are needed by the gateway devices in a service group. The gateway devices then provide content as needed to the various CPE in communication therewith.

In yet another embodiment, switching occurs at a hub or network headend, and only QAM modulation (and other requisite functions) occurs at the gateway. In one variant, switching may be performed only for a single gateway device 318; in other words, the gateway device 318 is the only device in a service group serviced by a particular network hub. According to this embodiment, the hub may service more than one service group (i.e., more than one gateway 318) as well.

Because ordinary broadcast programming is supplied using BSA, the transport network needs to have a high degree of availability. In the exemplary embodiment, BSA program transport is supplied through a redundant, spatially diverse counter-rotating Ethernet ring topology to the service node and/or premises gateway. Other topologies may be utilized with success.

In addition to "broadcast" content (e.g., video programming), the systems of FIGS. 3 and 4 also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs; i.e., those with an "internet module" of the type previously described herein) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery. In this fashion, a parallel delivery mode to the normal broadcast delivery exists; i.e., delivery of video content both over QAMs generated by the gateway to the RF tuner of the user's CPE or other receiver device for viewing on the television, and also as packetized IP data over the same or different QAM(s) to the user's PC or other IP-enabled device via the user's gateway.

In one embodiment of the present invention, a "packet optimized" delivery network may be used for carriage of the packet content (e.g., IPTV content) when the request issues from an MSO network, as described in co-pending U.S. Provisional Patent Application Ser. No. 61/256,903 entitled "METHODS AND APPARATUS FOR PACKETIZED CONTENT DELIVERY OVER A CONTENT DELIVERY NETWORK", incorporated herein by reference in its entirety. Such a network provides significant enhancements in terms of common control of different services, implementation and management of content delivery sessions according to unicast or multicast models, quality-of-service (QoS) for IP-packetized content streams, service blending and "mashup", etc.; however, it is appreciated that the various features of the present invention are in no way limited to any of the foregoing architectures.

Referring now to FIG. 4, the IP packets associated with Internet services are received by the gateway switch apparatus 324, and forwarded to the cable modem termination system (CMTS) 316. The CMTS 316 examines the packets, and forwards packets intended for the local network to the switch 324 via the optical transport (e.g., FTTH network). Other packets are discarded or routed to another component.

The gateway switch 324 forwards the packets received from the CMTS 316 to the QAM modulator 320 of the gateway device 318, which transmits the packets on one or more physical (QAM-modulated RF) channels to the CPE 106. The IP packets are typically transmitted on RF channels that are different that the RE channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

In addition to on-demand and broadcast content (e.g., video programming), the system of FIGS. 3-4 may also deliver Internet 111 data services using the Internet protocol (IP), although other protocols and transport mechanisms of the type well known in the digital communication art may be substituted. One exemplary delivery paradigm comprises delivering MPEG-based video content, with the video transported to the user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels, such as a multiplexed transport stream (MPTS). In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem. Delivery in such packetized modes may be unicast, multicast, or broadcast. Delivery of the IP-encapsulated data may also occur over the non-DOCSIS QAMs, such as described in co-pending U.S. Provisional Patent Application Ser. No. 61/256,903 entitled "METHODS AND APPARATUS FOR PACKETIZED CONTENT DELIVERY OVER A CONTENT DELIVERY NETWORK", incorporated herein by reference in its entirety. As discussed therein, a "packet optimized" delivery network is used for carriage of the packet content (e.g., IPTV content) when the request issues from an MSO network. Such a network provides significant enhancements in terms of common control of different services, implementation and management of content delivery sessions according to unicast or multicast models, quality-of-service (QoS) for IP-packetized content streams, service blending and "mashup", etc.; however, it is appreciated that the various features of the present invention are in no way limited to any of the foregoing architectures.

Premises Gateway—

Figure 5:
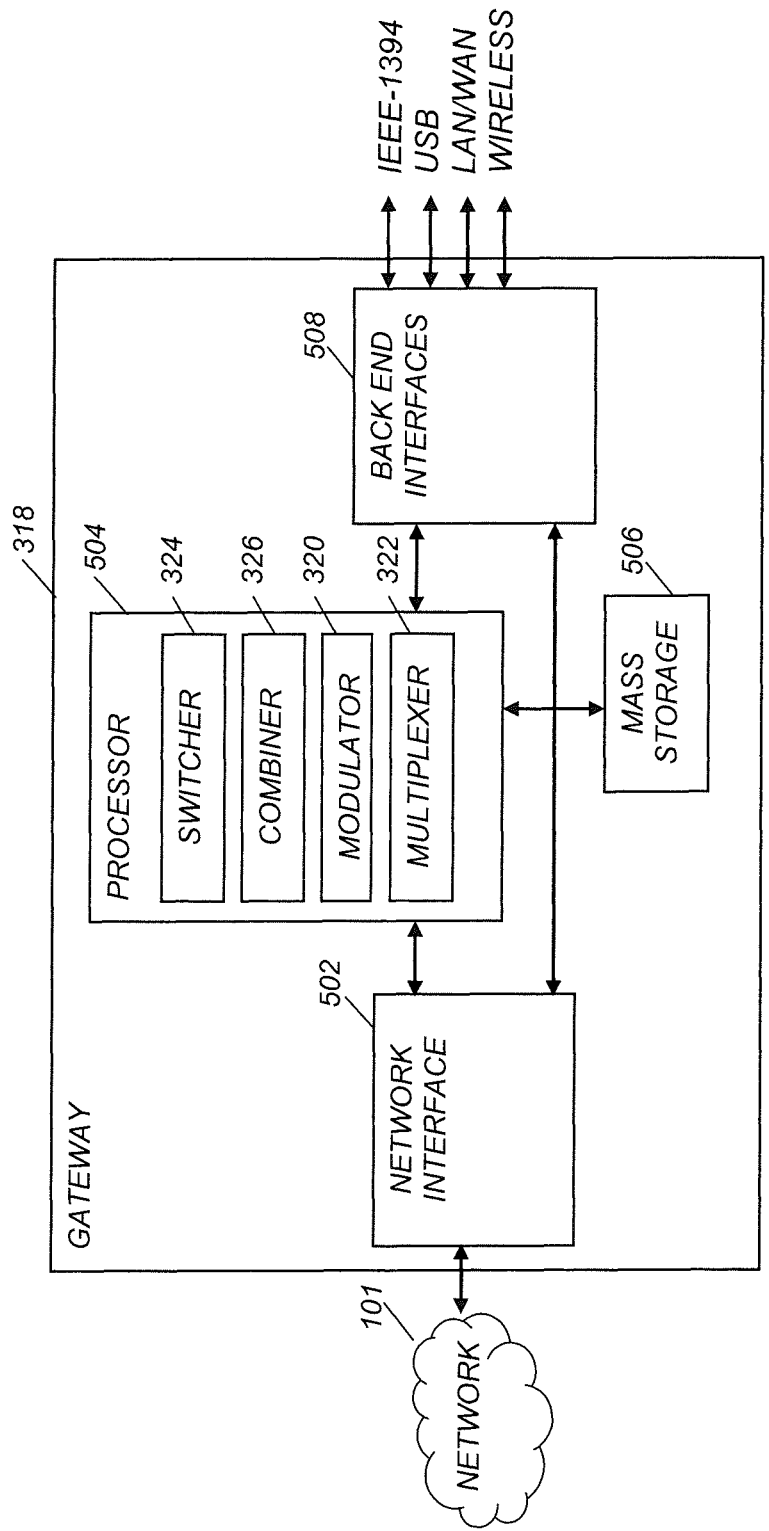
FIG. 5 is a functional block diagram illustrating an exemplary premises gateway device according to one embodiment of the present invention.

Referring now to FIG. 5, an exemplary embodiment of the premises gateway 318 is illustrated. As shown, the apparatus generally comprises a network interface 502, processor 504, mass storage device 506, and a plurality of back-end interfaces 508. In one exemplary embodiment, the processor 504 is configured to run one or more computer applications thereon. The computer applications may provide one or more of: switching 324, combining 326, modulating 320 and multiplexing 322 capabilities.

The gateway device 318 of the present invention contains QAM tuners (or more accurately modulator-upconverters). In one exemplary embodiment, the apparatus 318 contains a single QAM tuner IC with Ethernet IP input and 20 channels of QAM output of the type previously described herein. Additionally, the gateway may include VSB-AM modulators for analog channels, and/or clear QAM modulators for QAM broadcast services.

The gateway 318 of the present invention is connected via an IP connection to the ONU of the EPON system. Alternatively, the gateway may incorporate the EPON ONU and connect directly to the fiber plant.

In yet another variant, the gateway 318 further includes an RF output to the existing home wiring, which may then serve as the device communication system in addition to carrying RF video in a MoCA compliant premises network. Additionally, CAT-V wiring and/or wireless communications may be used for data services.

In embodiments where the gateway 318 includes a switching function 324, the premises gateway 318 is able to provide broadcast switched or switched digital video to the CPE 106. The gateway 318 receives from the network a plurality of content. The gateway device 318 then provides one or more of the content elements to the CPE 106 in communication therewith.

As previously noted, the gateway device 318 may be flooded with all available content or alternatively may only receive content switched in by a headend switching device which relates to one or more gateway apparatus 318. In the first variant, all switching function is performed by the gateway premises 318. In the second variant, the switching is performed at the headend or a hub, which includes content "as needed" for one or more gateway apparatus 318.

The premises gateway apparatus 318 of the present invention may further be configured to run applications configured for combining 326, modulating 320 and/or multiplexing 322 content streams. Whether content is delivered using traditional broadcast methods (see e.g., FIG. 3 above) or BSA/SDV methods (see e.g., FIG. 4 above), or otherwise, content is delivered via the optical transport (e.g., FTTH) to the gateway device 318, which then processes the content for delivery to the CPE 106. Content is delivered to the CPE 106 on one or more QAM channels, thus the gateway apparatus 318 uses QAM modulation 320 to provide requested programming on available QAM channels. The gateway apparatus 318 may further combine and/or multiplex content (via the combiner 326 and multiplexer 322) prior to modulating the content onto the QAM channels (via modulator 320). The present embodiment enables surplus QAM channels to not be limited by spectrum or traffic because the service group is one premises (or a small group of premises, such as homes).

The network interface 502 in one embodiment comprises an FTTH interface for receiving content over an optical fiber. Alternatively, the network interface may comprise a wireline interface, such as where the optical signals are converted to the electronic or radio frequency domain before delivery inside the user's premises.

The mass storage 506 may comprise for example a random access memory (RAM) and/or a hard disk drive (e.g., SATA), an optical drive (e.g., CD-ROM or DVD), NAND flash memory, or some combination thereof. The hard disk may in one embodiment be removable without the need for tools, such as by comprising an external USB (e.g., USB 2.0 or 3.0) drive.

The gateway apparatus 318 also optionally may include a network processing unit (e.g., network processor, not shown) to process the premises or home network (e.g., HLAN) services. The network processor also provides the ability to download firmware updates via TFTP or another selected protocol as desired.

While discussed herein as providing content to the CPE 106 via a non-optical network, it is appreciated that the gateway device 318 may be further configured to provide content to these devices using an optical network as well, provided one or more CPE 106 receiving the content are capable of doing so over an optical network. For example, the premises may have an indigenous fiber network. Alternatively, wireless distribution is also contemplated, such as where a high-bandwidth wireless PAN or WLAN is used as the air interface. For example, the gateway 318 may include an OFDM modulator/demodulator, such that the logical program channels may be carried over a number of different physical RF carriers. The CPE 106 may tune directly to these channels (by possessing an OFDM demodulator, etc.), or alternatively the content received via the demodulated OFDM carriers can then be QAM modulated, such that the CPE can use an indigenous RF tuner as if the signals had been delivered over a traditional RF coaxial cable.

It will also be recognized that the configuration of FIG. 5 is merely intended to illustrate various principles of the invention. Additional embodiments having various other configurations may also be used consistent with the invention. For example, the gateway apparatus of FIG. 5 may not include all of the elements shown, and/or may include additional elements and interfaces such as for example an interface for the HomePlug A/V standard which transmits digital data over power lines, a Bluetooth, or other short-range wireless interface for localized data communication, a longer range (e.g., cellular or WiMAX) air interface, etc.

The illustrated back-end interfaces 508 comprise IEEE-1394, USB, LAN/WAN (e.g., RJ-45), and wireless. However, additional or different combinations of interfaces may also be utilized, including e.g., DisplayPort or HDMI interfaces and the like.

In one embodiment, the gateway apparatus 318 further comprises a cable modem (CM) of the type known in the art. In this fashion, and content or data normally streamed over the CM can be received and distributed by the gateway 318 to the connected CPE 106, such as for example packetized video (e.g., IPTV) as discussed above. The digital data exchanged includes IP or other packetized protocol traffic that provides access to internet services. As is well known in cable modem technology, such data may be streamed over one or more dedicated QAMs, or even multiplexed or otherwise combined with QAMs allocated for content delivery, etc. The packetized (e.g., IP) traffic received at the gateway 318 may then be exchanged with other digital systems in the local environment (or outside this environment) via, e.g. a wireless or Wi-Fi interface, an Ethernet interface, or a PnP interface. In other words, the gateway 318 receives DOCSIS signals optically, and then allocates these to QAM as discussed elsewhere herein.

This connection is preferably shared by all Internet devices in the premises; e.g. IPTV devices, PCs, laptops, etc. In addition, the gateway 318 can be remotely managed (such as from the head end 150, or another remote network agent) to support IP services such as DHCP, DNS, NAT and firewall capabilities as well as anti-virus, pop-up blocking, and spyware protection.

The gateway apparatus 318 may further create a home Local Area Network (LAN) utilizing the existing coaxial cable or other indigenous wiring in the home. For example, an Ethernet-over-coax based technology allows services to be delivered to other devices (e.g., the CPE 106) in the home utilizing a frequency outside (e.g., above) the traditional cable service delivery frequencies. For example, one embodiment of the invention uses frequencies on the order of 1150 MHz to deliver data and applications to other devices in the home such as PCs, PMDs, media extenders and set-top boxes. The coaxial network is merely the bearer; devices on the network utilize Ethernet or other comparable networking protocols over this bearer.

In accordance with still another embodiment of the invention, an Ethernet port (e.g., 10/100/1000/10,000) or other network interface of the gateway device 318 may be configured to provide auto-negotiation capabilities (e.g., for connection data rate and half- or full-duplex). The exemplary Ethernet interfaces also provide auto-MDI/MDIX. This automatic MDI/MDI-X feature provides the ability to automatically detect the required cable connection type and configure the device 318 properly to make use of the indigenous cable type. This feature effectively allows all Ethernet cables usable with any Ethernet device to be connected to the device without any additional modification or external logic. In one embodiment, the gateway 318 can identify the cable connection type, and adjust its MDI port to the cable by switching between the twisted and "straight" pairs. The auto switching function is typically accomplished prior to the auto-negotiation algorithm previously described, although other configurations are possible (e.g., a "test-and-then-configure as needed" type approach). The device may also optionally disable auto-negotiation and MDI/MDIX and may be manually configured.

Further, in one embodiment, the gateway apparatus 318 may also optionally include a MoCA retail compliant F-connector, diplex filter, or similar apparatus for providing data-over-coax capability. The gateway may also include a switched packet interface between the Ethernet port and the MoCA interface. In one embodiment, data traffic flows through the gateway 318 between the Ethernet or other network interface and MoCA ports without requiring host processor intervention, thereby freeing up host processor bandwidth for other uses, and ostensibly reducing the processing latency through the gateway 318.

The gateway device 318 may also be made compliant with the Digital Living Network Alliance (DLNA) requirements, such as DLNA Home Networked Device Interoperability Guidelines, version 1.0, 2.0 or later, each incorporated herein by reference in their entirety. In one variant, the device automatically discovers all DLNA-capable clients during boot up or other events, and presents the available content catalog to one or more clients. The device may also automatically start a DLNA-compatible media server at boot using only the aforementioned MoCA and/or Wi-Fi network interfaces.

The gateway device 318 transmits/delivers a plurality of SD and HD video formats including, without limitation, MPEG-1, MPEG-2, MPEG-4, AVC/H.264, WMV, VC-1, AVI and Real. The CPE 106 is also capable of providing for display a plurality of audio formats including e.g., MPEG-2 Audio, AC-3, AC-3+, AAC+, MP3, Real and WMA. A plurality of photo or image formats are also supported, including e.g., Graphic Image File (GIF), Joint Photographic Experts Group (JPEG), Bitmap (BMP) and Tag Image File Format (TIFF) to the connected CPE 106.

It will further be recognized that the present invention may be used in conjunction with a so-called "trusted domain" for content and other data protection if desired. Exemplary trusted domain apparatus (and methods) are described in co-owned and co-pending U.S. patent application Ser. No. 11/006,404 filed Dec. 7, 2004 and entitled "TECHNIQUE FOR SECURELY COMMUNICATING PROGRAMMING CONTENT", as well as U.S. patent application Ser. No. 10/894,884 filed on Jul. 20, 2004 of the same title, each of the foregoing being incorporated herein by reference in its entirety. These applications disclose, inter cilia, a multi-layered rights arrangement to prevent unauthorized use and transfer of protected content, especially in a home or other premises network. For example, the home network may be considered to comprise multiple layers. One such layer may be a "trusted domain," described in aforementioned U.S. application Ser. No. 10/894,884. In a cable TV system for instance, the trusted domain might include not only the system portion where programming content traditionally is secured by and within total control of a cable operator (e.g., the head-end, delivery network, etc.), but also user devices, e.g., STBs, gateways, or other CPE located at a subscribers' premises which are capable of receiving and securely storing programming content in a prescribed manner. The cable operator can control certain subscriber access and usage with respect to content held within the trusted domain (such as via the gateway apparatus 318). For example, movie content held within a cable operator's trusted domain (e.g., on a hard drive of an STB, gateway, or other CPE) cannot be distributed over the Internet in viewable form, and cannot become a source for duplication of multiple viewable copies.

A second layer of the model may be defined as being outside the trusted domain. A device in the second layer is assigned an indicator or other mechanism for indicating an extent of security of the device. For example, when the device in the second layer requests transfer of protected content from a device in the first layer, the first layer device authenticates the second layer device to determine legitimacy of the device for receiving the protected content. After the second layer device is authenticated, the first layer device transfers not only the protected content, but also a set of rules associated with the protected content. At least some of the rules in the set are associated with the indicator and applicable to the second layer device with respect to use of the protected content.

So-called "DCAS" systems (downloadable conditional access systems) may also be used consistent with the invention in order to define/enforce trusted domains within the CPE environment 140, or other environments in data communication therewith. In one embodiment, the methods and apparatus of co-owned, co-pending U.S. patent application Ser. No. 11/584,208 filed on Oct. 20, 2006 and entitled "Downloadable Security and Protection Methods and Apparatus", which is incorporated herein by reference in its entirety, may be utilized as well. As discussed therein, the gateway 318 (or other entity) may implement a download paradigm for legacy or newly developed CA, TD, and DRM software and cryptographic protection schemes. This allows the network operator, and even the third party content provider by proxy, to exert additional control on viewing, reproduction, and migration of content distributed over the network.

Additionally, the gateway apparatus of the present invention may comprise a remotely manageable premises device that, inter alia, acts as a centralized client networking platform providing gateway services such as that described in co-owned, co-pending U.S. patent application Ser. No. 11/378,129 filed on Mar. 16, 2006 and entitled "METHODS AND APPARATUS FOR CENTRALIZED CONTENT AND DATA DELIVERY", which is incorporated herein by reference in its entirety. As discussed therein, the apparatus acts as the shared internet (e.g., Internet) connection for all devices in the premises, sharing personal and DVR content such as video, music and photos (and any associated metadata) throughout the premises, and providing both a wired and wireless network in the home. Telephony services utilizing e.g., embedded multimedia terminal adapter (eMTA) and/or Wi-Fi architectures may also be provided via the device; these services can make use of the network operator's indigenous VoIP or comparable telephony capability if desired, thereby providing an even more unified service environment. The converged premises device can also allow a subscriber total mobility in the home by not limiting content or data to any one viewing/access location. For example, content or data may be accessed on any monitor in the premises, as well as on a PC or personal media device (PMD) such as an MP3 player, smartphone or the like. A wired home network utilizing existing coaxial cable in the premises can also be created, using e.g., an Ethernet-to-coaxial bridge technology based on the MoCA specification. This allows existing devices to connect and share content with the gateway, and also allows the network operator (e.g., MSO) to control and manage the premises coaxial network. The gateway is also advantageously accessible via any remote device with internetworking (e.g., Internet) capability, thereby allowing personal content to be accessed by the user from outside the premises.

In yet another embodiment, the premises gateway apparatus 318 of the present invention may be further configured to acts as a unified proxy for all inbound (downstream) and outbound (upstream) communications with the network as discussed in co-owned, co-pending U.S. patent application Ser. No. 11/818,236 filed on Jun. 13, 2007 and entitled "PREMISES GATEWAY APPARATUS AND METHODS FOR USE IN A CONTENT-BASED NETWORK", which is incorporated herein by reference in its entirety. As discussed therein, a gateway apparatus is provided to unify at least portions of the functionality of a set-top box (STB) or similar customer premises device, or a digital video recorder (DVR), with those of another device such as a cable modem. In one exemplary variant, the out-of-band signaling and communication functions typically necessary on STBs and DVRs are obviated in favor of the premises services gateway (PSG) device, which acts as a unified proxy for all inbound (downstream) and outbound (upstream) communications with the network. The gateway of this embodiment also advantageously consolidates in-band tuner resources. In one variant, communication between the various entities (e.g., DVR and STB and PSG OOB proxy) is accomplished using IP-based communications. In another variant, client devices that support a cable RF tuner and an IP channel distributed over coaxial cable to the PSG are configured to receive all video or data information over the IP network only. In other embodiments, one or both of the foregoing DVR and STB are further physically integrated within the PSG, thereby allowing for a fully unified platform. This unified platform can use a common form factor (i.e., one box), a common coaxial interface to the parent network, common AC power supply, and even common operating system, storage devices, and middleware. Common control and user interface environments may also be utilized, such as where a single "universal" remote is provided to afford control of all STB, tuning and DVR functions. The PSG may also be configured to interface with any number of other devices which may be present in the customer's premises, such as e.g., MoCA-based LANs, Ethernet LANs, Wi-Fi LANs, PANs, or even personal media devices (PMDs). The PSG can also act as a router, provide network address translation (NAT) functions, and even act as a DHCP server if so configured. In another aspect, the exemplary PSG embodiments disclosed herein further facilitate the aim of easier movement of content within a "trusted domain" or authorized service domain (ASD) by inter alia unifying multiple devices and functions within a single device.

In another aspect of the invention, the aforementioned gateway apparatus 318 optionally includes an operations and/or business rules engine (e.g., rendered as one or more computer programs running on the processor 504 thereof). This engine comprises, in an exemplary embodiment, a series of software routines running on the device that are adapted to control the delivery of requested content across the available QAM(s). These rules may also be fully integrated within the delivery process itself, and controlled via e.g., a GUI on a PC connected to the gateway apparatus 318. It is also appreciated that the rules engine may be implemented at a network entity as opposed to or in addition to the gateway 318.

In effect, the rules engine comprises a supervisory entity which monitors and selectively controls the delivery of content so as to implement desired operational or business rules.

For example, one rule implemented by the rules engine may comprise selectively servicing (or at least queuing first) content requests from certain users or devices (or classes of devices) first; e.g., those with a higher subscription priority or level, those with QoS or other temporal requirements (e.g., so as to maintain a more uniform and low-latency user experience), and only after this tier of users is satisfied, servicing any remaining content requests. Note that this rule may be applied either at the gateway 318 or CPE 106 level.

In yet another embodiment, additional consideration may be changed for each CPE 106 to which a subscriber adds service (i.e., content delivery) via the gateway 318. In other words, a certain fee may be assessed per CPE 106 within a subscriber's home network.

Exemplary Methods—

It is noted that prior art systems generally utilize two-way client devices, network based QAM modulators, resource managers, routers and guide data servers. According to these systems, the client device obtains a list of available channels from the guide data server. It discovers its location (service group identifier (SCID)) and SDV server IP address by reading the contents of a QAM signal. When a user of the client device selects a program from the list, the SGID and program request are sent to the SDV server. The server then directs the QAM (i.e., the complete chassis of a typical QAM modulator) to perform a multicast membership request (for example, to a locally-proximate switch-router disposed in a rack near the QAM). The QAM modulator chassis performs multicast replication and multiplexing, as well as Quadrature Amplitude Modulation. This exemplary QAM equipment has an embedded controller function that can receive and send messages (in one embodiment using the IGMPv3 protocol), which allows it to receive the request to multiplex a new stream into one of the outbound MPTS multiplex channels on one of its multi-channel outputs to a connected service group. The SDV server interprets a client message, and consults its stored table of what the QAM is streaming, and sends a message to the QAM to add a stream to a channel/output port. The QAM then takes the server's instruction with the stream's IP multicast address, and sends a message to the router to request "membership" in the multicast (if not already joined). The router responds with the port address, and the QAM then binds the flow and adds it to the instructed channel/port, including performing replication if more than one port needs the same stream. The QAM equipment then notifies the SDV server. The server responds to the device request with tuning details which enable the device to tune to the stream. The router discussed herein is a multi-purpose aggregation router used in the hub which, in one embodiment is connected to a CMTS.

If the router does not already have a connection to the stream, it requests the stream from other routers until the stream is located and the flow may be started. In this manner, it is not necessary for the connection between the QAM and routers to carry all available or offered streams at all times. The transport network between routers and between the last router and the QAM input may, in one embodiment, be a native IP transport network. This network may only carry program streams that are being consumed by a device, and because they are multicast, only one copy of a given stream need be carried.

In the above-described prior art HFC SDV system, resource contention for scarce RF spectrum occurs on the RF output, common HFC network side of in the shared QAM modulator pool at the hub, while the IP connection to those QAMs is engineered for full time streaming, and does not experience any contention. The present invention advantageously eliminates the foregoing problems associated with a shared QAM modulator, by allowing the scarce RF spectrum to be re-used at each customer location.

Referring now to FIGS. 6-9, exemplary methods for providing and receiving content according to the present invention are described.

In the exemplary systems described herein, QAM channels are generated at the subscriber's premises, rather than in the distribution hub (see FIGS. 3 and 4 discussed above). This moves resource contention from the RF QAM array (at the network or hub) into the IP connection (EPON system). The premise is easily engineered for no QAM contention. It is noted, however, that in one embodiment of the present invention, there is no RF path for CPE communications (alternative communications means are discussed below).

Figure 6:
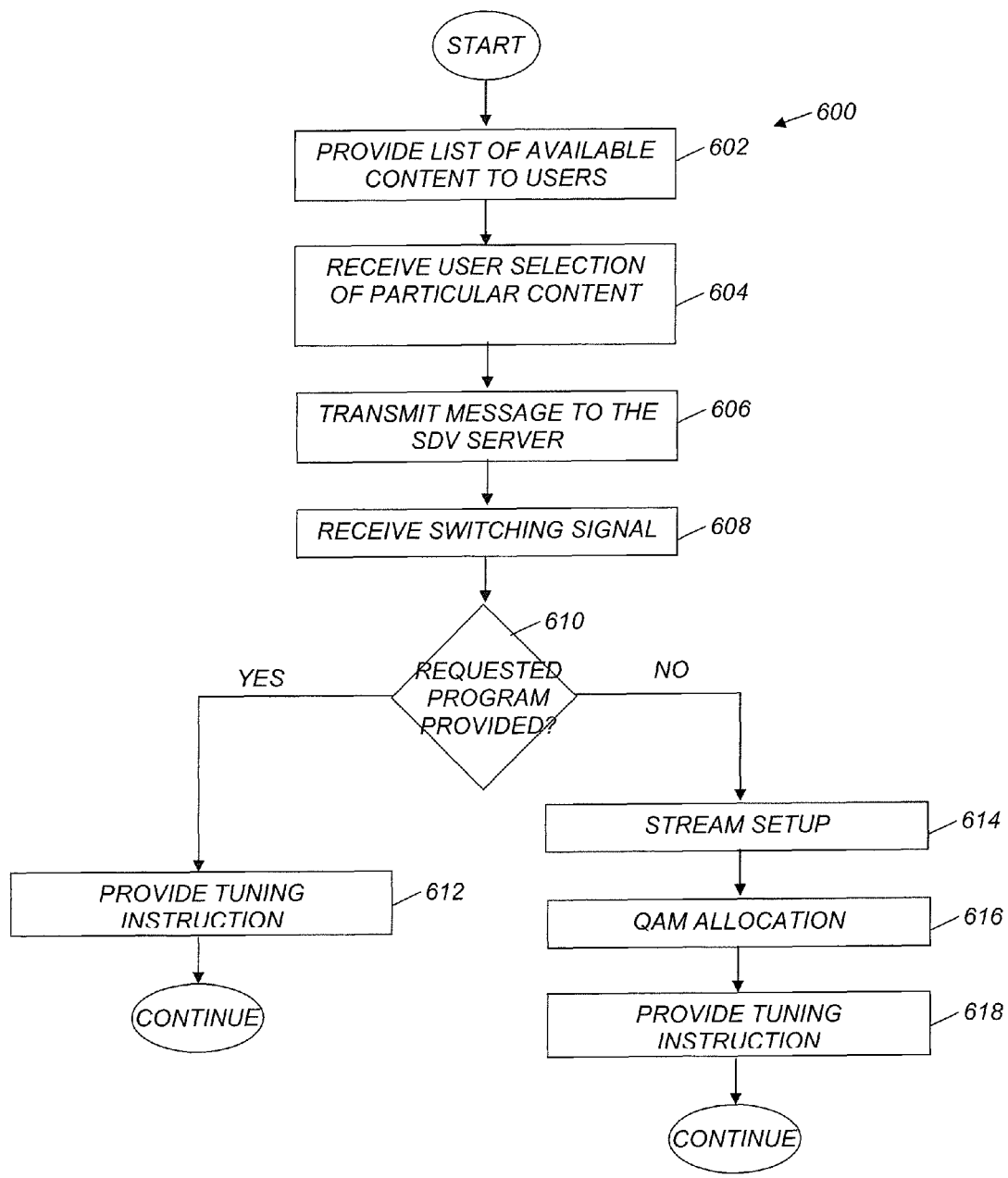
FIG. 6 is a logical flow diagram illustrating one embodiment of a method for providing content and data in a BSA or SDV network via the gateway apparatus of FIG. 5.

FIG. 6 illustrates an exemplary method 600 for providing content and data over a network to a plurality of CPE 106 via a gateway apparatus 318 of the present invention. As shown, at step 602, a list of available content is provided to the users. In one embodiment, a single QAM channel within the premises is devoted to a guide data server (not shown) for providing information utilized in forming an electronic program guide (EPG) for display to the user. In prior art systems, a feed to the guide data server already exists. According to the present embodiment, however, the feed is multicast on the fiber delivery network (e.g., EPON). The existing feed may be copied, thereby utilizing 37.5 Mbit/sec. That is to say, the standard net video payload for an exemplary single, 256QAM 6 MHz RF signal is typically regarded as 37.5 Mbit/s. This is evenly divisible into ten 3.75 Mbit/s SD video streams or three 12.5 Mbit/s HD video streams. Since this is a standardized value, when an MPTS is assembled by a multiplexer (such as built into the QAM chassis, or by a statistical multiplexer), it is typically filled with video or padded to this fixed rate, as that guarantees it will exactly fit if supplied to a QAM.

In an alternative embodiment, reductions in this rate are possible due to the small number of connected settops per guide data stream (for example, a 32-subscriber network). In one implementation, rather than using pre-assembled MPTS multiplexes at 37.5 Mbit/s, an assortment of multicast SPTS streams, such as a mix (e.g. five 3.75 SD streams and one 15.0 HD stream) are utilized, that are then multiplexed by the customer-side QAM into an MPTS.

Next, per step 604, a selection of particular content is received at the gateway device 318 from at least one CPE 106. As noted previously, in one embodiment, the CPE 106 does not directly communicate to headend entities, but instead conducts communications through the gateway apparatus 318. Accordingly, a single DOCSIS QAM channel is, in one variant, provided for legacy modems and DOCSIS set top gateway (or DSG) devices. The DOCSIS QAM channel consumes up to an "always on" 37.5 Mbit/sec. According to this embodiment, a DOCSIS upstream receiver is also provided at each home. In one embodiment, this may be accomplished using the methods and apparatus discussed in previously referenced U.S. Pat. No. 7,231,655, which has been previously incorporated herein by reference in its entirety.

DAVIC communications may also be supported through the gateway by pre-filter-selection followed by analog-to-digital (A/D) and D/A block conversion of DAVIC signals in both directions, such as by using low-cost converters readily available.

Firmware modifications to DAVIC devices may be provided to allow either MoCA capability or a built-in Ethernet connector to be used for the IP signals transmitted using DSG RF in current generation devices. Non-DSG devices may also be capable of IP communications via an RJ-45 Ethernet connector.

At step 606 of the method of FIG. 6, a message is transmitted to the SDV server at the network headend indicating the CPUs selection of content. The CPE may communicate directly to the SDV server or other headend entity, rather than through the gateway as a proxy, or through the gateway as previously described, depending on the desired functionality.

The gateway device 318 receives, in response to the CPE 106 request for content, a switching signal (step 608). The switching signal indicates to the gateway that particular content should be switched (multiplexed) into delivery to the CPE 106 via the switch function 324 thereof.

In one embodiment, the gateway 318 is flooded with all content, and merely provides a set of content to the various CPE 106 in communication therewith. When such a gateway 318 receives the switching signal, the device determines whether the requested program is already provided (step 610). If the content is already provided, per step 612, tuning instructions are provided to the CPE 106 indicating a QAM channel on which the program is being delivered. The tuning instruction may be provided directly thereto, or may be provided to a network entity with which the CPE is in communication. If the requested content is not already being provided by the gateway 318, per step 614, a stream is instantiated for the requested content. The gateway 318 may be configured to process a program stream such as by combining 326 and/or multiplexing 322 the content. Per step 616, the gateway 318 then modulates 320 the processed content so that it may be allocated to one or more QAM channels. Tuning instructions are provided to the CPE either directly from the gateway or indirectly from a network entity (step 618).

Figure 7:
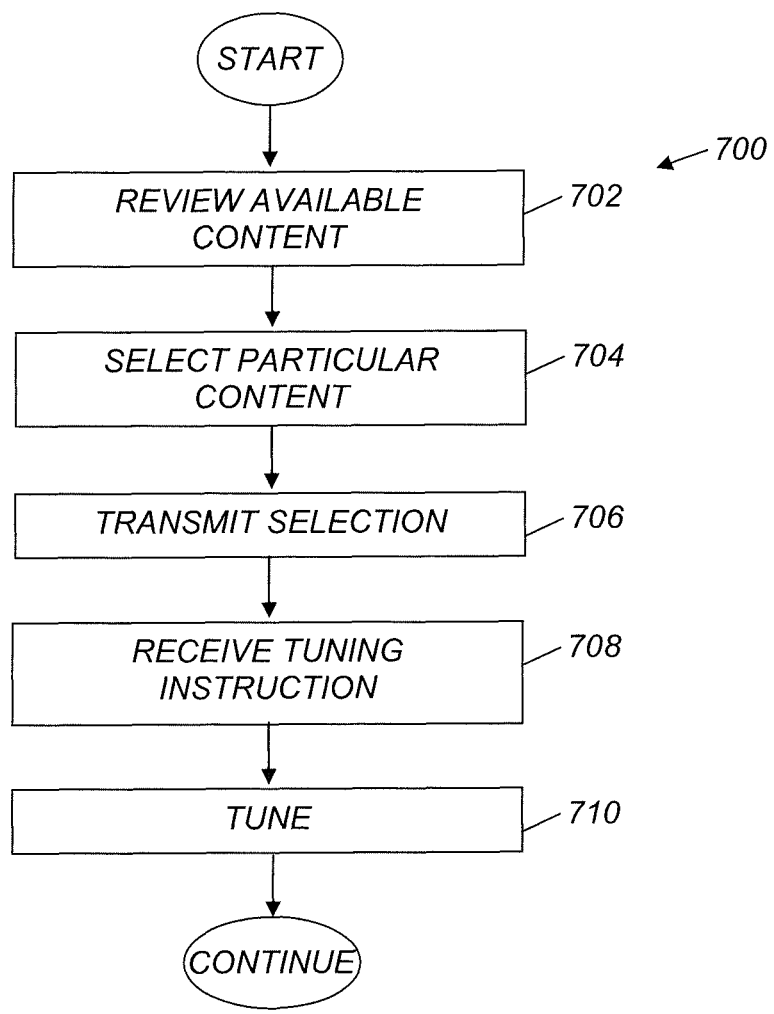
FIG. 7 is a logical flow diagram illustrating one embodiment of a method for receiving content and data in a BSA or SDV network via the gateway apparatus of FIG. 5.

Referring now to FIG. 7, an exemplary embodiment of a method 700 for receiving content and data at a CPE 106 via a gateway apparatus 318 is illustrated. Per step 702 of the method, a user first reviews available content. As noted above, available content may be presented to the subscriber e.g., on a dedicated QAM channel as a feed from a program guide server. The dedicated nature of the QAM channel providing the program guide data precludes the QAM channel from being reassigned or otherwise stopped from at least providing the guide data. A user interface, such as an EPG application running on the CPE, may be provided with which the subscriber may interact in order to select content for viewing (step 704).

At step 706, the user's selection is transmitted to the SDV server 404. In one embodiment, the user's selection may be transmitted directly to the SDV server 404 (whether via the gateway 318 or an alternate communication channel). Alternatively, the selection may be transmitted to one or more proxy devices at the headend or other network location.

In response to receiving the selection, tuning instructions are received at the CPE 106 (step 708). The tuning instructions may be received directly from the SDV server 404 whether via the gateway apparatus 318 or other communication channel, or from another intermediary entity. The tuning instructions are utilized by the CPE 106 to tune to the appropriate one or more QAM channels generated by the gateway 318 in order to receive the requested content (step 710). Alternatively, the CPE may be provided with fixed locations where certain programming will be carried, such as would be the case if a wide band QAM modulator system is deployed at the customer premises with a portion of the output thereof dedicated to fixed channel allocations.

Figure 8:
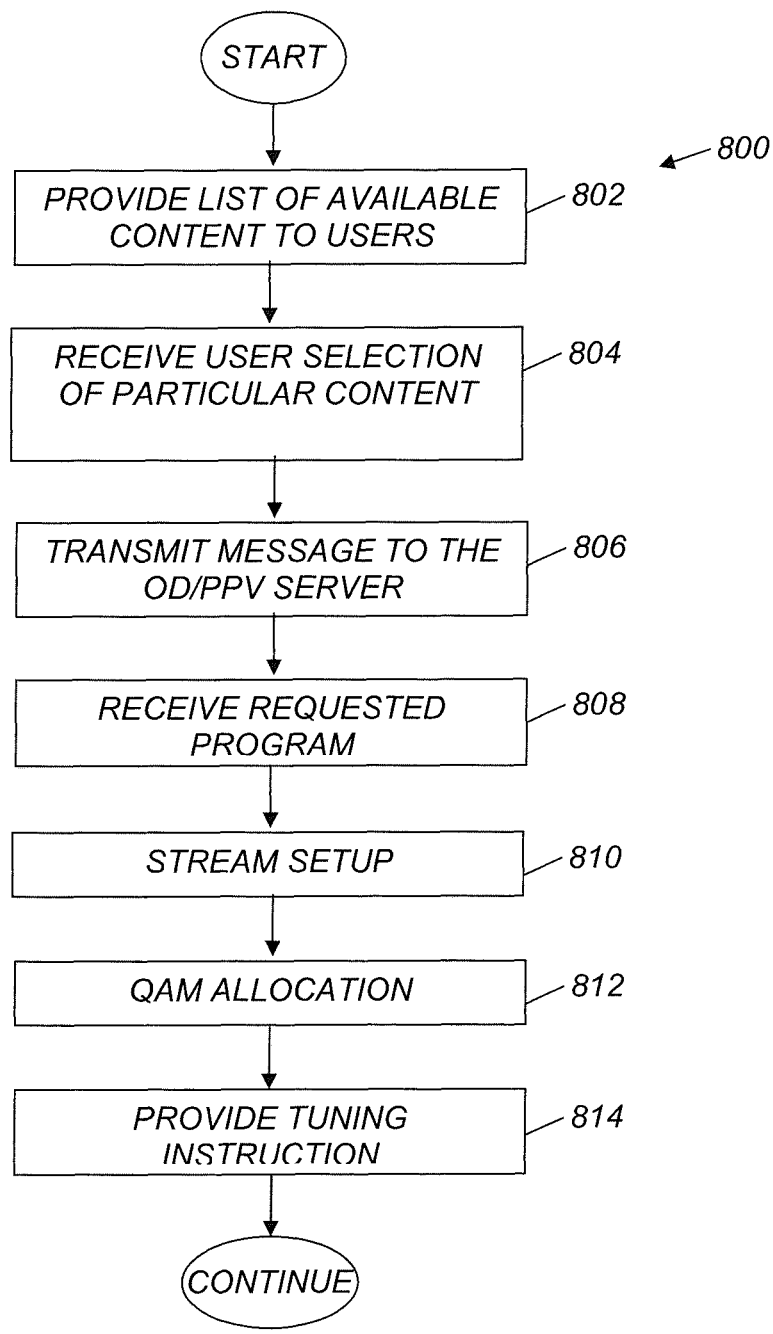
FIG. 8 is a logical flow diagram illustrating one embodiment of a method for providing content and data on-demand to a CPE via the gateway apparatus of FIG. 5.

Referring now to FIG. 8, an exemplary embodiment of a method for providing content and data "on-demand" (OD) from a gateway apparatus 318 according to the present invention is illustrated. As shown, per step 802, the gateway apparatus 318 provides a list of available content to each of the devices connected thereto. As discussed previously, the list may be provided on a dedicated QAM channel, or via other suitable means.

Next, at step 804, a selection of particular content is received from the CPE 106. The selection is then transmitted to an OD/PPV server 310 (step 806) via the gateway 318. It is noted, however that in other embodiments, the gateway does not act as a proxy for upstream CPE 106 selections/content requests. Rather, the CPE 106 may provide its selections directly (or through a headend proxy) to the OD/PPV server 310 without involving the gateway apparatus 318.

In response to the OD/PPV server 310 receiving the request for content, the gateway 318 is provided with the requested OD program. The gateway 318 then prepares the content for delivery to the CPE 106 by multiplexing 322 and/or combining 326 the content, and setting up a program stream for its delivery (step 810). The content is allocated to one or more QAM channels using the gateways modulator 320 (step 812). Tuning information is then provided directly or indirectly from the gateway 318 to the CPE 106 indicating the one or more QAM channels on which the content may be received (step 814). Alternatively, the gateway may pre-assign channel location, and inform the CPE of such tuning details prior to the actual video packets arriving, so as to minimize the impact of tuning latency. This is possible due to the ability to deploy a much wider band (greater output channel count) QAM for very few CPE devices, such that surplus locations are easily reserved without bandwidth impact to other users.

Figure 9:
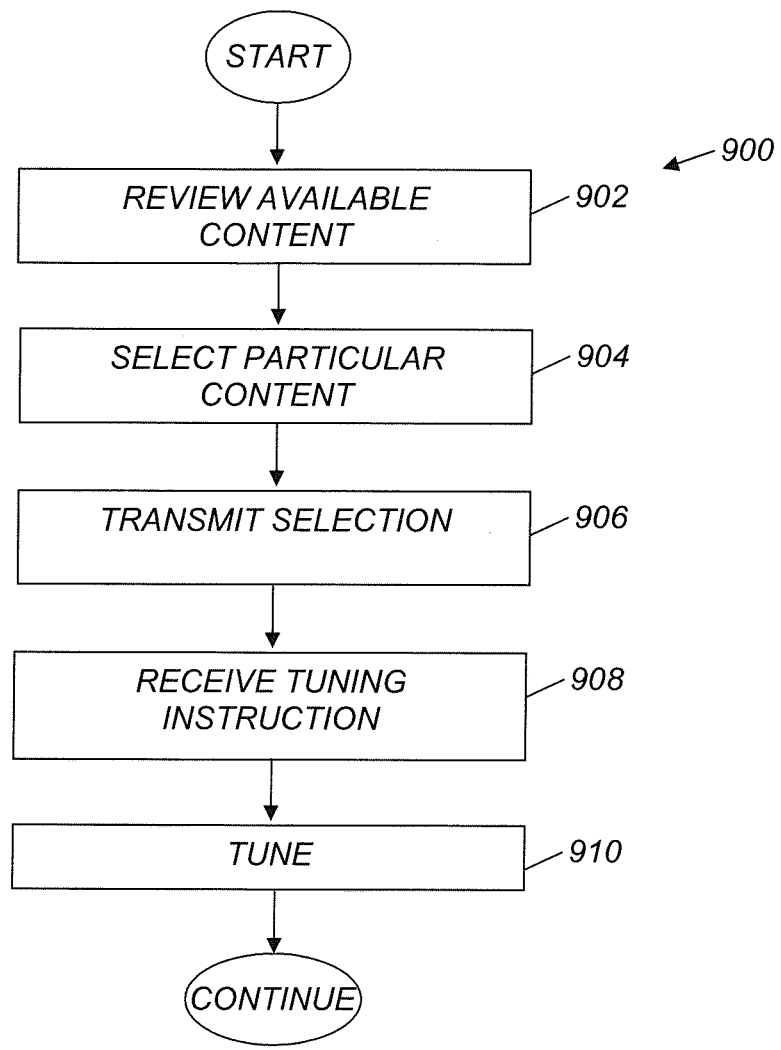
FIG. 9 is a logical flow diagram illustrating one embodiment of a method for receiving content and data on-demand at a CPE via the gateway apparatus of FIG. 5.

FIG. 9 illustrates an exemplary embodiment of a method for receiving content and data on-demand at a CPE 106 via the gateway apparatus 318 of the present invention. As shown, per step 902, the CPE 106 reviews the list of available content, such as via an EPG user interface of the type previously described. Per step 904, a selection of particular content is made. The user's selection is the transmitted to the OD/PPV server 310 via the gateway 318 (as a proxy), or via another communication channel and/or intermediary (headend) entity (step 906).

Next at step 908, the CPE 106 receives tuning instructions indicating the one or more QAM channels on which the content is being delivered. Tuning instructions may be received either directly from the gateway 318, or alternatively from an entity with which the CPE 106 and the gateway 318 are in communication. The CPE 106 may then tune to the specified QAM (step 910) and begin receiving the requested program.

On-demand trick modes, in one embodiment, use the same signaling request-response bidirectional control links as other types of program stream requests. Trick modes operate without "relinquishment" of the occupied stream, since there is typically surplus QAM output bandwidth available when the QAM is located at the customer premises as discussed herein. For instance, a "stop" command stops packet flow on the Ethernet link, but maintains a tuned relationship between the QAM and CPE to allow a speedy re-start. For employing a "pause" command, a still image continues to stream from a local buffer in the gateway, again without packets traversing the link. Fast forward and/or rewind functions are implemented in one embodiment by loading packets at high speed in bursts based on Ethernet bandwidth availability, while buffering them in the gateway for output spooling at the CPE-selected rate.

Consumer Premises Equipment (CPE)—

Figure 10:
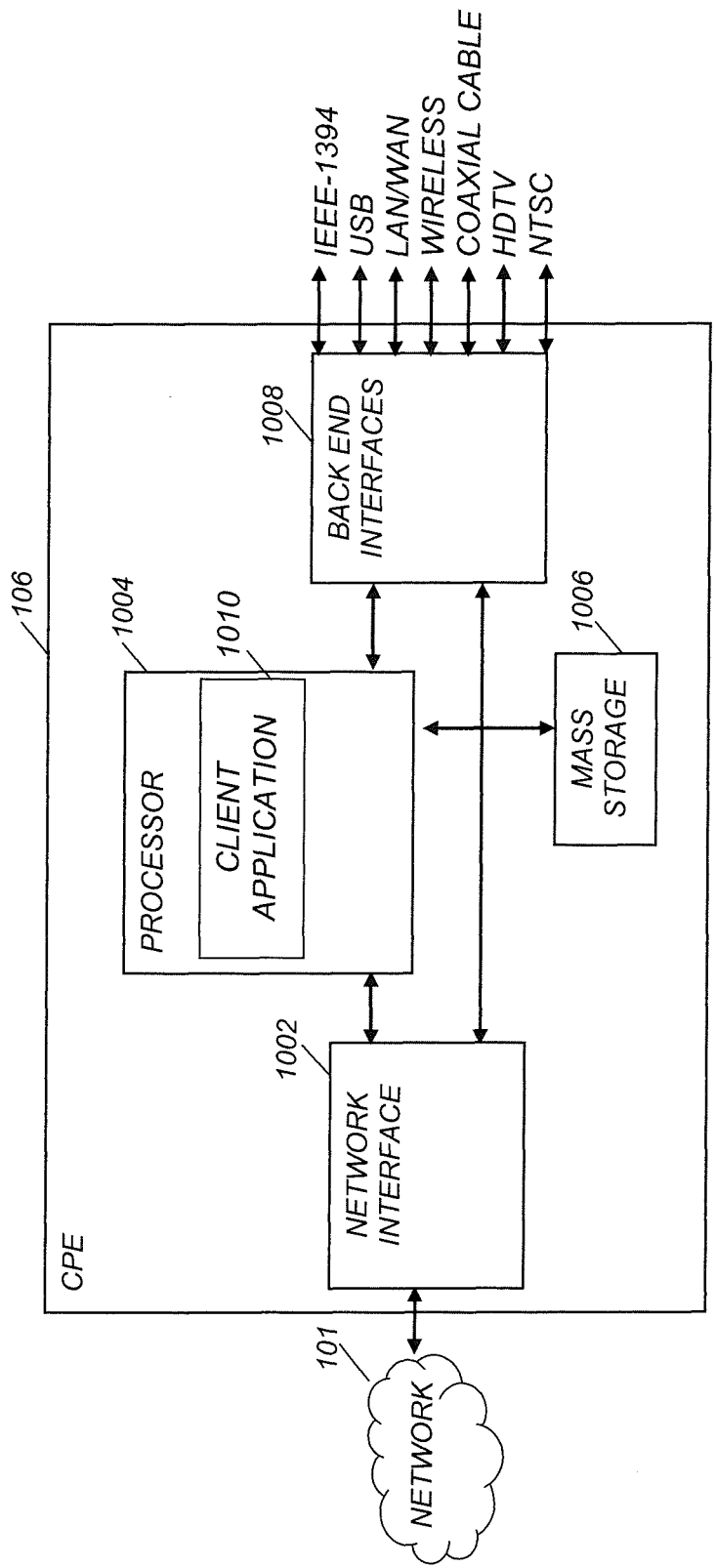
FIG. 10 is a functional block diagram illustrating one embodiment of a CPE according to the present invention.

FIG. 10 is a functional block diagram illustrating an exemplary CPE 106 useful with the present invention. As shown in the simplified diagram of FIG. 10, the CPE 106 generally comprises at least one network interface 1002, a processor 1004, mass storage device 1006, and one or more back end interfaces 1008 (e.g., video/audio interfaces (e.g., HDMI, DisplayPort, etc.), IEEE-1394 "FireWire", USB, serial/parallel ports, etc.) for interface with other end-user apparatus such as televisions, personal electronics, computers, Wi-Fi or other network hubs/routers, etc.

One network interface 1002 provides communication between the CPE 106 and the gateway apparatus 318 (and indirectly the network). Other interfaces may also be used, such as for direct communication with one or more entities of the content delivery network such as e.g., SD or OD servers or proxies. As noted above, in one embodiment, the CPE 106 may utilize DOCSIS, DAVIC, or other means for upstream communication to the network. Communication with the gateway apparatus 318 may occur via any number of different protocols including e.g., MoCA, Ethernet, DLNA, etc.

The interface 1002 of the illustrated embodiment also comprises an RF front end, including a tuner and demodulator/decryptors, so as to enable receipt, demodulation, and decoding of signals generated by the gateway 318.

Other components which may be utilized within the device (deleted from FIG. 10 for simplicity) include various processing layers (e.g., DOCSIS MAC or DAVIC OOB channel, MPEG, etc.), as well as media processors and other specialized SoC or ASIC devices. The CPE 106 may also include an integrated HD decoder, thereby relieving any connected monitors or other devices from the requirement of having such a decoder. Other trans-rating (HD-SD or SD-HD) or trans-coding (MPEG-2 to H.264, etc) may be included in the device, as may an OpenCable (OCAP)-compliant embedded system. These additional components and functionality are well known to those of ordinary skill in the cable and embedded system fields, and accordingly not described further herein.

The CPE 106 of FIG. 10 may also be provided with an OCAP 1.0-compliant application and Java-based middleware which, into alia, manages the operation of the device and applications running thereon. It will be recognized by those of ordinary skill that myriad different device and software architectures may be used consistent with the functions of the present invention, the device of FIG. 10 being merely exemplary. For example, different middleware (e.g., MHP, ARIB, or ACAP) may be used in place of the OCAP middleware of the illustrated embodiment.

The exemplary CPE 106 further include a conventional "Watch TV" application or the like, which services those program or user channels available over the network. The Watch TV application, residing in memory, provides such functions as channel navigation control, channel selection in response to a channel change event, etc. These functions may also be integrated with the aforementioned client application 1010 or other EPG application if desired.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention. The scope of the invention should be determined with reference to the claims.

What is claimed is:

1. A method of providing content to a plurality of client devices in a content delivery network via a gateway apparatus, said gateway apparatus being configured to modulate content onto one or more of a plurality of available quadrature amplitude modulated (QAM) radio frequency (RF) channels, said method comprising:
    receiving a plurality of content at said gateway apparatus located at a user premises;
    assigning a first one of said plurality of available QAM channels to provide to said plurality of client devices a list of said plurality of content, said plurality of client devices also located at said user premises;
    receiving a signal from a network entity, said signal indicating receipt at said network entity of a request for first content from a first one of said plurality of client devices;
    in response to receiving said signal, determining whether said first content is allocated to at least one of said plurality of available QAM channels;
    when said first content is allocated to at least one of said plurality of available QAM channels, notifying said network entity of said at least one QAM on which said first content is allocated; and
    when said first content is not allocated to at least one of said plurality of available QAM channels, allocating said first content thereto and notifying said network entity of said allocated one of said plurality of available QAM;
    wherein said network entity notifies said first one of said plurality of client devices of said at least one QAM on which said first content is allocated based at least in part on said notifications received from said gateway apparatus.

2. The method of claim 1, wherein said plurality of client devices are in communication with said network entity via upstream DOCSIS communication thereto.

3. The method of claim 1, wherein said act of receiving said plurality of content at said gateway further comprises receiving said content from at least one network entity via at least one optical fiber of an Ethernet passive optical network (EPON) network.

4. The method of claim 1, further comprising:
    processing said plurality of content at said gateway apparatus located at said user premises; and
    modulating said plurality content onto one or more QAM channels for delivery to said plurality of client devices.

5. The method of claim 1, wherein said signal comprises a switching control signal indicating said first content to be switched into delivery using a switched digital video (SDV) delivery mechanism.

6. Premises gateway apparatus configured to deliver content to at least one consumer premises equipment (CPE) in said premises, said apparatus comprising:
    at least one first interface for communication to at least one entity of a content delivery network;
    a storage device;
    at least one second interface for communication to said at least one CPE; and
    a processor, said processor configured to run at least one computer program thereon, said at least one computer program comprising a plurality of instructions which are configured to, when executed, cause said gateway apparatus to:
        receive at least one signal configured to indicate particular content to be provided to said at least one CPE;
        determine whether said particular content is among a plurality of content currently delivered to said at least one CPE;
        when said particular content is determined to be among said plurality of content, provide tuning information to said CPE configured to indicate a quadrature amplitude modulated (QAM) channel on which said particular content may be received; and
        when said particular content is determined not to be among said plurality of content currently delivered to said at least one CPE, initiate a new stream for said delivery thereof on one or more available QAM channels.

7. The apparatus of claim 6, wherein said at least one CPE is configured to receive said QAM channels via one or more radio frequency (RF) tuners.

8. The apparatus of claim 6, wherein said signal comprises a switching control signal configured to indicate said particular content to be switched into delivery via switched digital video (SDV) delivery mechanisms.

9. The apparatus of claim 6, wherein said plurality of instructions are further configured to cause said gateway apparatus to receive a plurality of available content, said particular content being among said plurality of available content, and said plurality of available content being provided to said gateway apparatus prior to said network receiving any requests for any one of said plurality of available content.

10. The apparatus of claim 6, wherein said signal is received at least in response to said one or more of said plurality of CPE configured to request said particular content from said network.

11. A method for providing content in a content delivery network to a plurality of client devices located within a subscribers premises via a premises gateway device, said method comprising:
receiving at least a signal indicating a request for items of available content being broadcast by said content delivery network to be delivered to at least one client device;
determining whether at least one of a plurality of quadrature amplitude modulated (QAM) radio frequency (RF) communication channels generated by a modulator apparatus of said gateway device is currently assigned to provide said items of available content to said at least one client device;
when said at least one of said plurality of QAM RF communication channels is currently assigned based on said act of determining, providing tuning information to said at least one client device, indicating a QAM channel on which said items of available content may be received;
when at least one of said plurality of QAM communication channels is not currently assigned based on said act of determining, said gateway device assigning at least one of said plurality of QAM communication channels to provide said items of available content to enable delivery thereof to said at least one client device; and
distributing said items of available content via said at least one QAM communication channels generated by said gateway device to said at least one client device.

12. The method of claim 11, wherein said signal indicates that said request is received from a client device.

13. The method of claim 11, wherein said signal indicates that said request is received from a network entity with which said at least one client device is in communication.

14. The method of claim 13, wherein said at least one client device is in communication with said network entity via upstream DOCSIS communication thereto.

15. The method of claim 11, further comprising receiving said items of said available content from at least one network entity via at least one optical fiber of an Ethernet passive optical network (EPON) network.

16. Gateway apparatus for use within a user premises and configured to deliver content to a plurality of user devices connected thereto over one or more quadrature amplitude modulated (QAM) radio frequency (RF) channels, said apparatus comprising:
an optical interface configured to receive a plurality of content from an optical network;
a non-optical interface configured to provide individual ones of said received plurality of content to said plurality of user devices via one or more communication channels; and
a processor, said processor configured to run at least one computer program thereon, said at least one computer program comprising a plurality of instructions which are configured to, when executed, cause said gateway apparatus to:
receive at least one request configured to indicate particular content to be provided to said at least one client device;
determine whether said particular content is among a plurality of content currently delivered to said at least one client device;
when said particular content is determined to be among said plurality of content, provide tuning information to said at least one client device configured to indicate said RF channel on which said particular content may be received directly or indirectly to said at least one client device; and
when said particular content is determined not to be among said plurality of content currently delivered to said at least one client device, instantiate a new stream for said delivery thereof on one or more available RF channels.

17. The apparatus of claim 16, wherein said optical interface comprises an optical fiber in communication with a point-to-multipoint baseband digital optical network and said non-optical interface comprises a radio frequency (RF) transmitter for transmitting RF signals to said plurality of user devices.

18. The apparatus of claim 16, wherein said indirect communication of said tuning information is provided to said at least one of said plurality of user devices via a network entity.

19. The apparatus of claim 16, wherein said optical interface is further configured to receive a signal configured to indicate a request for a first one of said plurality of content was received at a network entity from at least one of said plurality of user devices.

20. A method of delivering content to a user at a premises, comprising:
determining whether a particular content is among a plurality of content currently delivered to said premises;
when said particular content is determined to be among said plurality of content, providing tuning information to said premise configured to indicate a quadrature amplitude modulated (QAM) radio frequency (RF) channel on which said particular content may be received;
when said particular content is determined not to be among said plurality of content currently delivered to said premises, delivering content over a fiber-based distribution network to said premises;
causing a gateway at said premises to generate QAM RF channels for distribution of said particular content within said premises; and
causing said gateway to allocate said particular content to at least one of said QAM RF channels.

21. The method of claim 20, wherein said act of distributing comprises distribution of said QAM channels over coaxial cable indigenous to said premises.

22. The method of claim 20, wherein said act of delivering content comprises delivering a plurality of content elements generated by a switched network server simultaneously to said gateway.

23. The method of claim 20, wherein said act of delivering content comprises delivering a content element generated by an on-demand network server to said gateway, said content element being used to generate an on-demand program stream within said premises.

* * * * *